United States Patent
Nix et al.

(10) Patent No.: US 8,558,660 B2
(45) Date of Patent: Oct. 15, 2013

(54) METHOD AND APPARATUS FOR DETECTING AND IDENTIFYING DEVICE UTILIZATION

(75) Inventors: Harvey A. Nix, Birmingham, AL (US); Lloyd Guyton Bowers Cooper, Birmingham, AL (US); Don Byron Walker, II, Muscle Shoals, AL (US); Andrew Joseph Thomson, Birmingham, AL (US); Eugene Arnold Eighmy, Birmingham, AL (US)

(73) Assignee: Proventix Systems, Inc., Birmingham, AL (US)

( * ) Notice: Subject to any disclaimer, the term of this patent is extended or adjusted under 35 U.S.C. 154(b) by 45 days.

(21) Appl. No.: 12/619,856

(22) Filed: Nov. 17, 2009

(65) Prior Publication Data
US 2010/0123560 A1    May 20, 2010

Related U.S. Application Data

(60) Provisional application No. 61/116,057, filed on Nov. 19, 2008.

(51) Int. Cl.
G08B 19/00    (2006.01)

(52) U.S. Cl.
USPC .......... 340/5.1; 340/572.1; 340/10.1; 340/6.1

(58) Field of Classification Search
None
See application file for complete search history.

(56) References Cited

U.S. PATENT DOCUMENTS

| | | | |
|---|---|---|---|
| 5,363,425 A | 11/1994 | Mufti | |
| 5,572,195 A | 11/1996 | Heller | |
| 5,793,653 A | 8/1998 | Segal | |
| 5,945,910 A | 8/1999 | Gorra | |
| 6,150,948 A * | 11/2000 | Watkins | 340/693.3 |
| 6,236,317 B1 | 5/2001 | Cohen | |
| 6,392,546 B1 | 5/2002 | Smith | |
| 6,426,701 B1 | 7/2002 | Levy | |
| 6,577,240 B2 | 6/2003 | Armstrong | |
| 6,882,278 B2 | 4/2005 | Winings et al. | |
| 7,015,816 B2 | 3/2006 | Wildman et al. | |
| 7,242,307 B1 * | 7/2007 | LeBlond et al. | 340/573.1 |
| 7,375,640 B1 * | 5/2008 | Plost | 340/573.1 |
| 7,551,092 B1 * | 6/2009 | Henry | 340/573.1 |

(Continued)

FOREIGN PATENT DOCUMENTS

| | | |
|---|---|---|
| KR | 1020030056886 A | 7/2003 |
| KR | 1020030064068 A | 7/2003 |

OTHER PUBLICATIONS

Larson, Elaine L., RN, PhD, FAAN, CIC, "APIC Guidelines for Infection Control Practice", 1992, 1993, and 1994 APIC Guidelines Committee, Association for Professionals in Infection Control and Epidemiology, Inc.

Sharir, R. et al., "High-level handwashing compliance in a community teaching hospital: a challenge that can be met", The Hospital Infection Society, 2001.

Boyce, John M. MD, et al., "Guideline for hand hygiene in health-care settings", From the Hospital of Saint Raphael, New Haven and University of Geneva, 2002.

(Continued)

*Primary Examiner* — Mohammad Ghayour
*Assistant Examiner* — Brian Wilson
(74) *Attorney, Agent, or Firm* — Paul M. Sykes; Bradley Arant Boult Cummings LLP

(57) ABSTRACT

A system and method for detecting the presence of a device user, managing a detection system in a predominantly low power state, ensuring data integrity and limiting the amount of user interaction required to identify users and detect device utilization includes a distinct user tag or badge including an active or passive RFID transceiver and one or more readers and routers in a network.

21 Claims, 12 Drawing Sheets

(56) References Cited

U.S. PATENT DOCUMENTS

| | | | |
|---|---|---|---|
| 7,782,214 B1* | 8/2010 | Lynn | 340/573.1 |
| 2007/0028119 A1 | 2/2007 | Mirho | |
| 2007/0210923 A1* | 9/2007 | Butler et al. | 340/572.8 |
| 2007/0257803 A1* | 11/2007 | Munro et al. | 340/573.1 |
| 2007/0285229 A1* | 12/2007 | Batra et al. | 340/539.26 |
| 2007/0285241 A1 | 12/2007 | Griebenow et al. | |
| 2008/0106374 A1* | 5/2008 | Sharbaugh | 340/5.8 |
| 2008/0131332 A1* | 6/2008 | Nguyen et al. | 422/119 |
| 2009/0091458 A1* | 4/2009 | Deutsch | 340/573.1 |
| 2009/0224907 A1* | 9/2009 | Sinha et al. | 340/539.11 |
| 2009/0295539 A1* | 12/2009 | Mahmoodi et al. | 340/5.83 |

OTHER PUBLICATIONS

Lankford, Mary G. et al., "Influence of Role Models and Hospital Design on Hand Hygiene of Health Care Workers", Emerging Infectious Diseases, Feb. 2003, pp. 217-223, vol. 9, No. 2.

New Mexico MRSA Collaborative, "Employee Observations, Observation Instructions for Isolation Patients".

PCT: International Search Report of PCT/US2009/064922; International Publication No. WO 2010/059678; Jun. 29, 2010; 3 pages.

PCT: Written Opinion of the International Searching Authority of PCT/US2009/064922; International Publication No. WO 2010/059678; Jun. 29, 2010; 4 pages.

\* cited by examiner

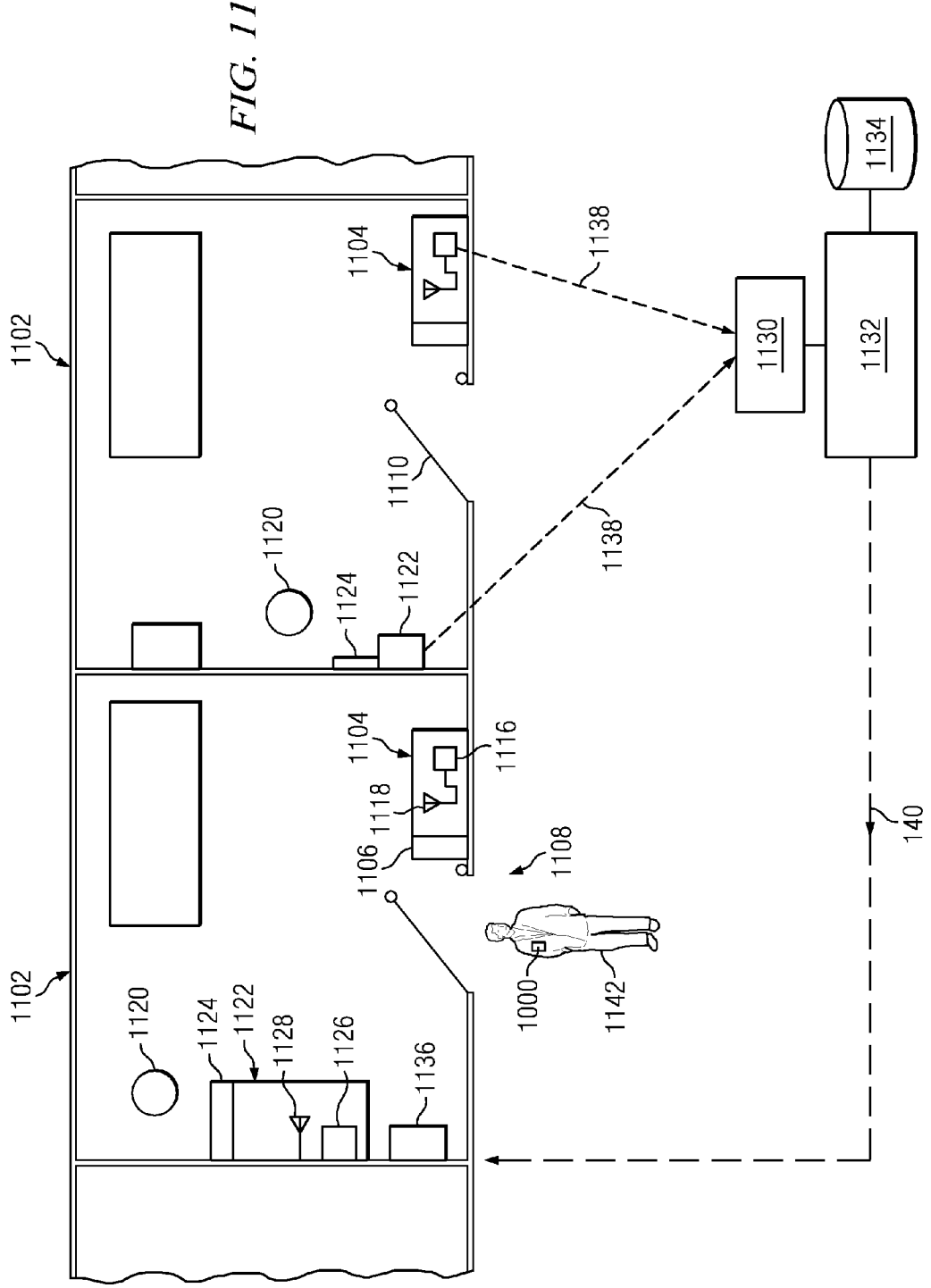

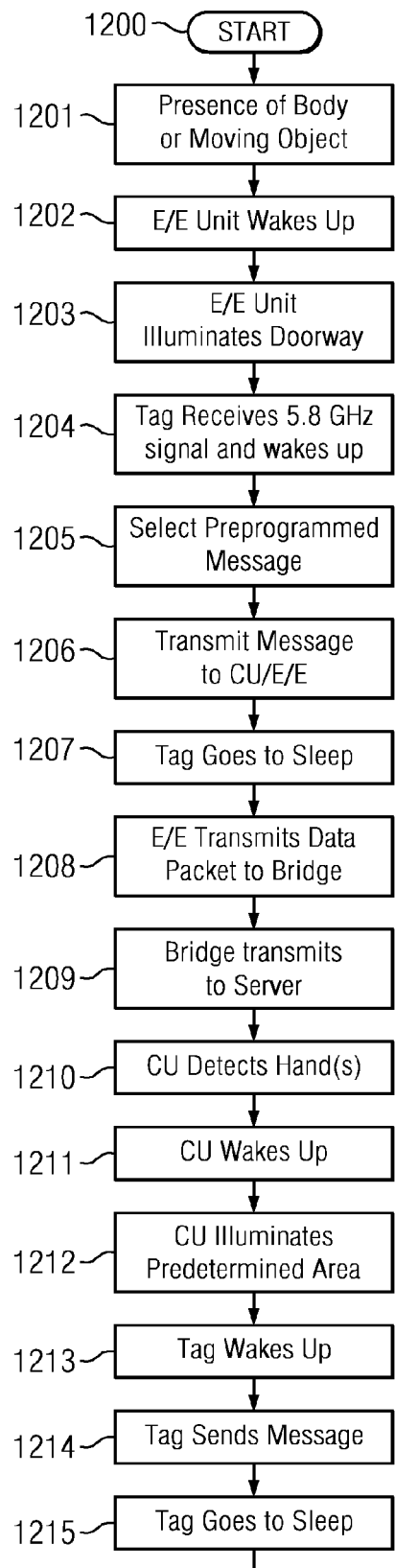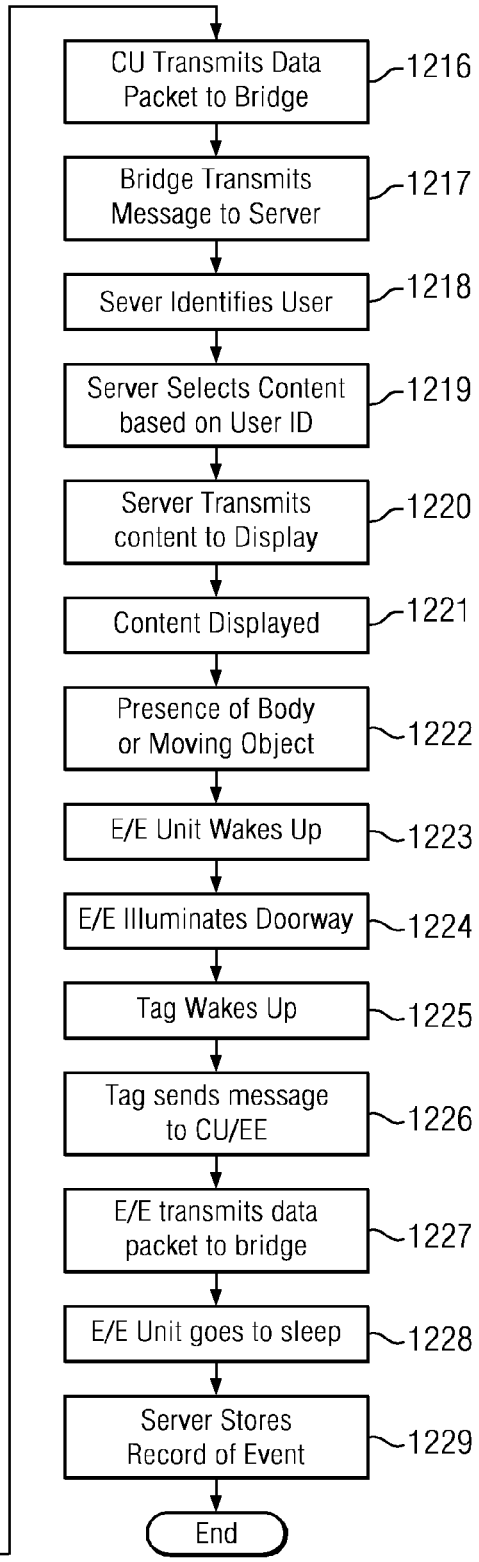
FIG. 12

METHOD AND APPARATUS FOR DETECTING AND IDENTIFYING DEVICE UTILIZATION

CROSS-REFERENCE TO RELATED APPLICATIONS

This application claims priority to U.S. Provisional Application for Patent Ser. No. 61/116,057, filed on Nov. 19, 2008, and entitled, "METHOD AND APPARATUS FOR DETECTING AND IDENTIFYING DEVICE UTILIZATION," the specification of which is incorporated herein by reference.

TECHNICAL FIELD

The following disclosure relates to apparatus, methods and systems for tracking machine or device usage for billing, behavioral modification or maintenance information.

BACKGROUND

In many instances, it is desirable to track a user's machine or device usage for billing, behavioral modification or maintenance information. While it is possible to use existing technology to read user identity information, current technology presents a number of challenges. These challenges include user identity integrity and interfering with user productivity by requiring card swipes or keypad entry. Another challenge is providing a small, battery powered user wearable device with sufficiently low power consumption to enable the device to function over a reasonably long period of time. It is also desirable to provide a system that can promote positive behavioral modification and simultaneously provide useful information to the user.

SUMMARY

The present invention disclosed and claimed herein comprises a system and method for detecting the presence of a device user, managing a detection system in a predominantly low power state, ensuring data integrity and limiting the amount of user interaction required to identify users and detect device utilization. In one embodiment, the system includes a distinct user tag or badge and one or more readers. The user tag may be configured with a low power receiver, a microprocessor and an active or passive RFID transceiver. In one embodiment, small, low-power digital radios based on the IEEE 802.15.4 standard for wireless personal area networks may be used to implement the system.

A system for monitoring device utilization may include active or passive user tags, entry/exit units for determining when a room or area is entered, control units associated with the monitored device, one or more routers or network bridges and one or more central servers for collecting and storing data. In one embodiment, the server or servers may be configured to transmit visual and/or audio content to a feedback mechanism such as a display or speaker associated with the monitored device. The user tags may be configured to be awakened from a low power sleep mode only periodically or upon receiving a "wake up" signal. The network bridge or bridges may receive data from entry/exit units, control units associated with monitored devices and/or user tags. The network bridge may be configured to translate messages received from user tags, entry/exit units and control units and to forward the translated data to a server for processing and use. As used herein, the term "control unit" includes devices capable of illuminating wearable passive or active RFID user tags with a radio frequency signal to activate the user tags when the unit is triggered by signal from a sensor such as a proximity sensor, a movement sensor or a similar device indicating that a user has entered an area, is in proximity to a monitored device or is using the monitored device.

In one embodiment, to order to ensure that the correct user tag is read by a controller (e.g. coordinator/router), the tags are normally switched to a low power sleep mode and are only switched to an active state on when they are in close proximity to device such as a controller, entry/exit unit or a control unit associated with a monitored device. In this variation, the entry/exit detector or control unit activates the user tag which in turn transmits its identification code to a network bridge enabling position location of the tag. The low power sleep mode also has the benefit of power conservation, increased battery life, with a low power receiver left on to trigger devices to an active report state. A signal received by a user tag "wakes up" the tag from a low power sleep mode. The tag or other device may transmit its identity data and/or the identity of the device that awakened the tag from the sleep mode using either active RFID technology or passive RFID technology. In other embodiments, devices such as entry/exit units and control units associated with monitored devices are provided with highly directional antennas that illuminate only a predetermined area. Thus, only user tags in close proximity of the controller are powered and enabled to respond with a user, e.g., tag identity.

In one aspect, a system for monitoring use of a device includes an exit/entry detector for detecting an individual entering a room. The exit/entry detector may be, but not limited to, one of a reflective infrared detector, a vibration monitor, an overhead infrared detector or other suitable sensor. The exit/entry detector includes a transmitter and directional antenna for transmitting a range limited signal over a limited area upon detecting the individual entering the room. In one embodiment, a wearable user tag is operable in a low power "sleep" mode and in an active mode. The tag includes a receiver configured to receive the range limited signal in a passive mode and switch to an active mode to transmit a signal identifying the tag. The signal transmitted by the user tag may include a data packet with a unique identification number of the tag, the identity of the particular exit/entry detector and a time stamp. In one embodiment, the wearable user tag includes a receiver, a microprocessor, associated memory and a battery.

The system may also include control unit(s) associated with monitored device(s). Each control unit typically includes a sensor for detecting a parameter indicating use of the device. The parameter may vibration associated with the activation of a soap pump, a change in position of a faucet, body weight sensed by a pressure, proximity to a selected device or other sensed indication that a user is using the monitored device. The control unit may be configured to transmit a signal upon detecting a parameter indicating use of the device whereby the wearable tag is activated to transmit a signal including a data packet identifying the tag. In other embodiments, the tag may transmit the identity of the device and a time stamp. The system may further include a network bridge operable to receive transmissions from one or more of the exit/entry detector, the control unit or the wearable tag and transmit the transmissions to a server configured to receive and store the transmissions. The network bridge may be configured to translate the transmissions to a suitable format such as TCP/IP and transmit the information to a network server.

A feedback device in proximity to the monitored device presents selected content to a user of the monitored device upon detection of a parameter indicating use of the device. The feedback device may be a visual display, an audio device or another device capable of transmitting information to the user of the monitored device. The content presented with the feedback device may include compliance information, for example compliance with hand washing protocol, for the particular user or an average compliance for all users, providing motivation for compliance with procedures. In some embodiments the content presented with the feedback device may be specific to the user of the tag, for example, a healthcare provider, a patient or visitor. For example, vital signs such a blood pressure and heart rate may be presented with the feedback device. The content presented with the feedback device may include items of interest to the tag wearer, such as sports statistics, financial statistics or similar information. In one embodiment, the feedback device may be a display is associated with a hand washing or cleansing station, however the display may be associated with other devices, for example a patient bed, an intravenous delivery pump or other machines or devices where it may be desirable to monitor device utilization and/or compliance with procedures.

In another aspect, the wearable tag includes an active or passive RFID transceiver and the monitored device may be a hand washing or cleansing station in a health care facility such as a hospital. Sensors operable to indicate use of the hand washing or cleansing station may be a different proximity sensors including infrared sensors, vibration monitors, photocells or capacitive-sensing sensors for detecting a user's hand within a predetermined area adjacent the station.

In one embodiment, a system for monitoring use of a device includes an exit/entry detector for detecting an individual entering a room wherein the device is located, the exit/entry detector transmitting a radio frequency illumination signal over a limited, predetermined area upon detecting the individual entering the room. The system further includes a wearable tag operable in a low power sleep mode to receive the illumination signal and operable in an active mode upon receiving the illumination signal to transmit a signal identifying the tag. In one variation, the signal transmitted by the tag may include a data packet identifying the tag, the exit/entry detector identity and a time stamp. In other variations, the signal transmitted by the tag merely includes the tag identity code.

The system further includes a control unit connected to a sensor operable to detect a parameter indicating use of the monitored device. In one embodiment, the control unit is operable to transmit illumination signal over a limited, predetermined area to activate a wearable tag upon detection of a parameter indicating use of the device monitored device. In one variation, the wearable tag is activated by the illumination signal from the control unit to transmit an identification signal identifying the tag. In other variations the identification signal may identify the monitored device and a time stamp.

A network bridge is provided and is operable to receive data packets from one or more of the exit/entry detector, the control unit or the wearable tag. In one variation, the network bridge translates the transmissions to TCP/IP format and transmits the information from the translated data packets to a server configured to validate, store and send records of events such as room or area entry or use of a monitored device. A feedback device such as an audiovisual display in proximity to the monitored device presents selected content to a user of the monitored device upon detection of a parameter indicating use of the device. In one variation, the system includes a plurality of routers defining a network wherein the routers are operable to transmit data packets from one or more of the exit/entry detector, wearable tag or control unit to the network bridge.

BRIEF DESCRIPTION OF THE DRAWINGS

For a more complete understanding, reference is now made to the following description taken in conjunction with the accompanying Drawings in which:

FIG. 11 is schematic representation of an alternate system for monitoring device usage;

FIG. 12 is a flowchart illustrating a method of monitoring device usage with the system of FIG. 11;

DETAILED DESCRIPTION

Figure 1:
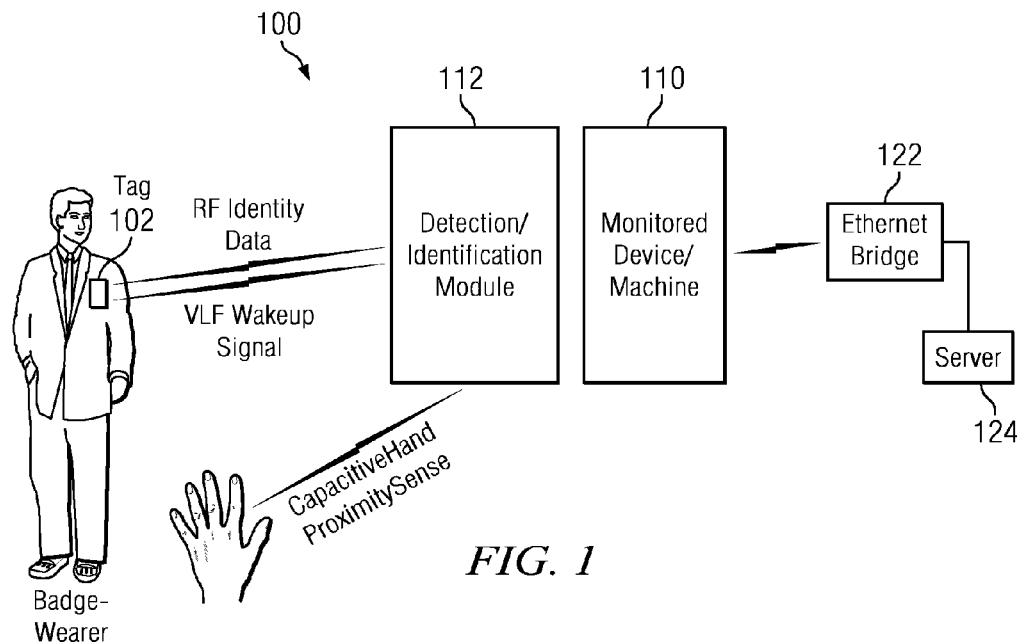
FIG. 1 is a block diagram of a first system for detecting device utilization according to one embodiment.

Referring now to the drawings, wherein like reference numbers are used herein to designate like elements throughout, the various views and embodiments of a system, method and apparatus for detecting and identifying device utilization are illustrated and described, and other possible embodiments are described. The figures are not necessarily drawn to scale, and in some instances the drawings have been exaggerated and/or simplified in places for illustrative purposes only. One of ordinary skill in the art will appreciate the many possible applications and variations based on the following examples of possible embodiments.

Figure 2:
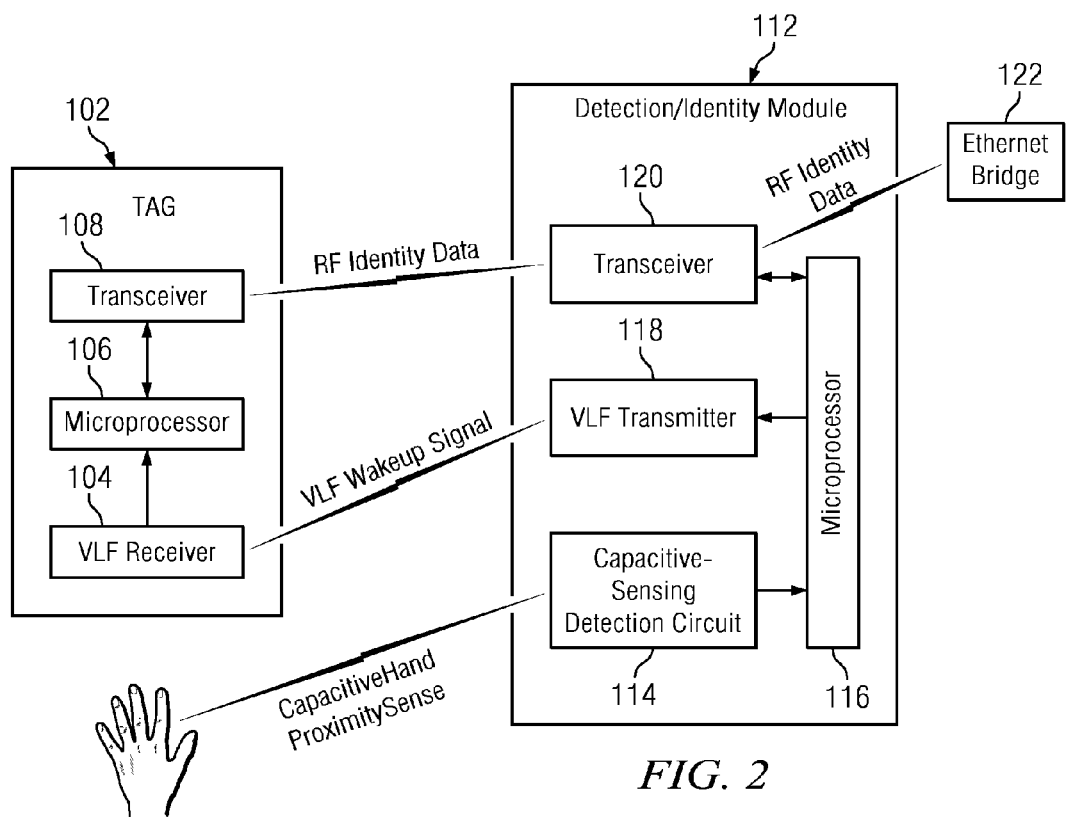
FIG. 2 is a more detailed block diagram of the system of FIG. 1.

Referring now to FIGS. 1 and 2, in one embodiment a system for tracking device usage generally designated as 100, utilizes wearable tags 102 which are configured with a low power receiver 104, a microprocessor 106 and a transceiver 108. Tags 102 may also be configured for attachment to devices such as beds, device supports, trays and other devices. Transceiver 108 is normally maintained in a low-power sleep state to conserve battery life.

As best illustrated in FIG. 2, in one variation, a detection/identification module 112 (e.g. control unit) associated with a monitored device 110 may include a capacitive-sensing detection circuit 114, a microprocessor 116, a transmitter 118 and a transceiver 120. The capacitive-sensing detection circuit 114 detects a user's proximity to device 110 by measuring changes in capacitance to ground. For example, in the case of hygiene monitoring, the sensor may be configured and positioned to sense a hand beneath a faucet or cleansing solution dispenser. In other embodiments, different sensing devices such as an infrared sensors or vibration monitors may be employed to detect when a user moves into a predefined proximity of device 110; for example when a user enters or passes through a doorway when a user is within a predetermined proximity of a monitored device or even in direct contact therewith.

In one embodiment, detection/identification module 112 may be maintained in a low-power consumption "sleep" mode to conserve battery life. Upon user detection by capacitive-sensing detection circuit 114, microprocessor 116 is powered up from the sleep state and activates transmitter 118 to transmit a data code to the tag 102. The effective radiated power of transmitter 118 may be calibrated to transmit at a power level sufficient to activate only the tag 102 of the user of the monitored device 110. In some embodiments, a directional antenna is utilized to transmit an RF signal over a preselected area to activate tag 102. Low-power receiver 104 of tag 102 decodes the transmitted data and upon success, powers the transceiver 106 of tag 102 into an active state. Tag 102 then responds to the transmission from detection identification module with a transmission identifying the tag. In one embodiment, detection/identification module or control unit 112 receives the transmission from tag 102 and forwards the tag identification by way of transceiver 120 to a network bridge 122. Network bridge 122 intercepts transmissions from the transceiver or transceiver(s), translates the transmissions to TCP/IP wired or wireless Ethernet format and forwards the data to a specified IP address.

In one embodiment, bridge 122 transmits data user identification and device identification to a server 124 which stores and catalogs the user identification along with the identity of device 110. Server 124 may also transmit a data acknowledgement back to the detection/identification module 112 via Ethernet Bridge 122. Detection/Identification module 112 then powers down into a sleep mode and may be powered up to an active mode by the capacitive-sensing detection circuit 114 or a similar entry/exit or control unit sensor.

Figure 3:
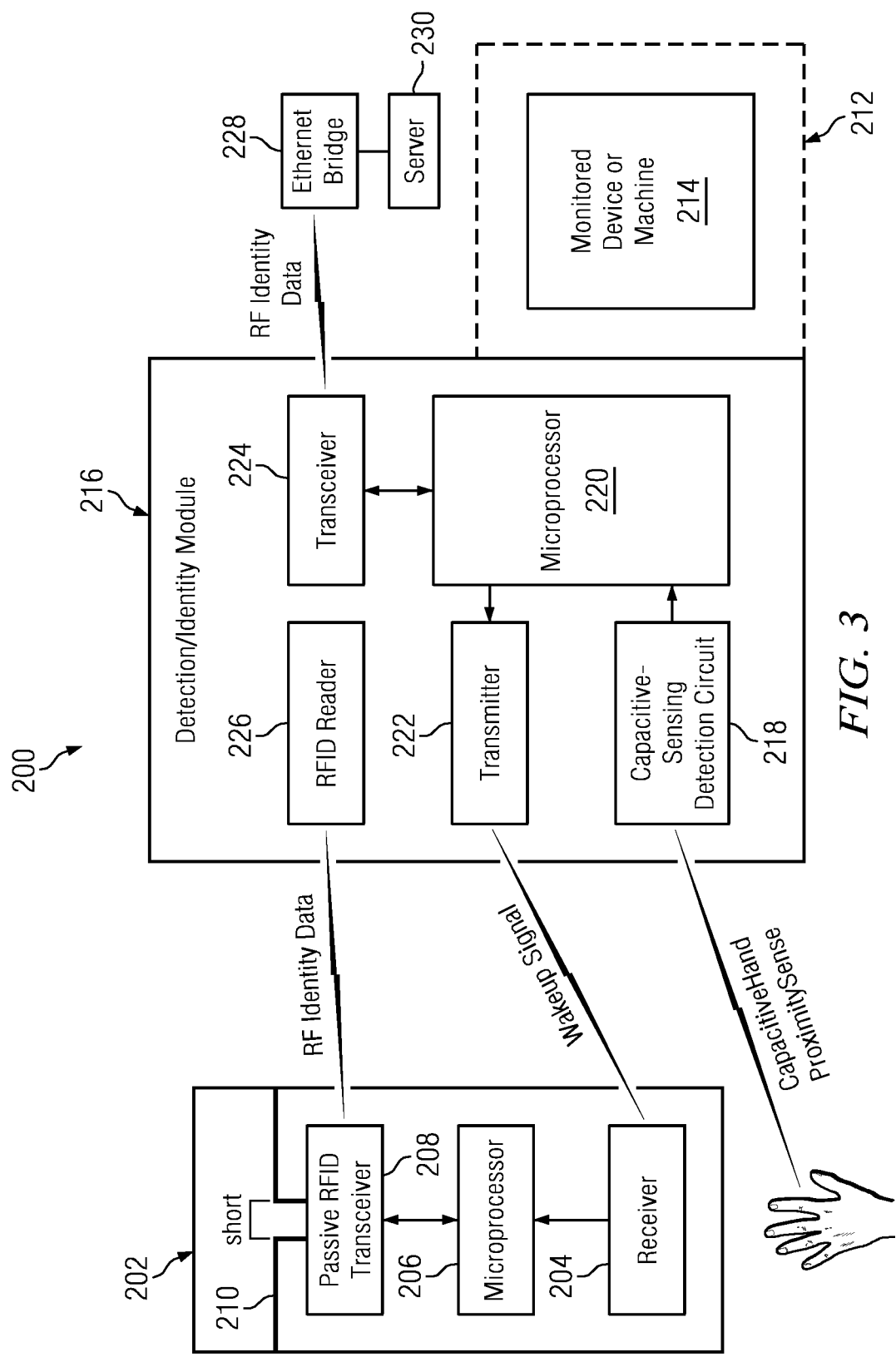
FIG. 3 is a block diagram of a second system according to one embodiment.

Turning to FIG. 3, in an alternate embodiment, a system 200 for monitoring device usage utilizes RFID transceivers 208. In this embodiment, a user is provided a wearable tag 202 including a low-power receiver 204, a microprocessor 206 and a passive RFID transceiver 208. Transceiver 208 may be held in a short range mode by short-circuiting a larger efficient antenna 210 to minimize erroneously reading tags 202 that are outside a valid predetermined area 212 of monitored device/machine 214. To monitor utilization of device or machine 214, a detection/identification module 216 is provided.

The detection/identification or control unit module 216 may include a capacitive-sensing detection circuit 218 or a similar sensor for sensing proximity. Detection/identification module 216 may also include a microprocessor 220, a transmitter 222, a transceiver 224 and a passive RFID reader 226. Capacitive-sensing detection circuit 218 detects a user's proximity to monitored device 214 by measuring changes in capacitance to ground. Detection/identification module 216 is held in a low-power consumption sleep state to conserve battery life until activated by capacitive-sensing detection circuit 218. Upon detecting a user within predetermined area 212, the microprocessor is powered to activate transmitter 222 to transmit a data code to user tag 202. The effective radiated power of transmitter 222 may be calibrated to activate only tag 202 of the user of the device 214 that is being monitored.

Low-power receiver 204 of tag 202 decodes the transmitted data and upon a successful, e.g. valid, transmission, enables the larger high-gain antenna 210 of RFID transceiver 208. RFID reader 226 reads a user tag identification transmitted by tag 202 and transmits the information to microprocessor 220. Microprocessor 220 may process the tag identity, and then store and transmit the tag user's identification and credentials to transceiver 224.

After a successful transaction, the RFID transceiver 208 may be placed back into a low range mode by shorting antenna 210 to ground. Detection/identification module 216 transmits the user identification by way of RFID transceiver 224 to Ethernet bridge 228. Ethernet bridge 228 transmits the data to a server 230 which stores and catalogs the user's tag identification along with the identity of device 214 and a time stamp. In one variation, server 230 transmits a data acknowledgement back to the detection/identification module 216 via Ethernet bridge 228. After transmission of the data acknowledgment, detection/identification module 216 powers down into a sleep mode that may be retriggered by capacitive-sensing detection circuit 218 or another sensor/transmitter to reactivate the module and take it out of sleep mode.

Figure 4:
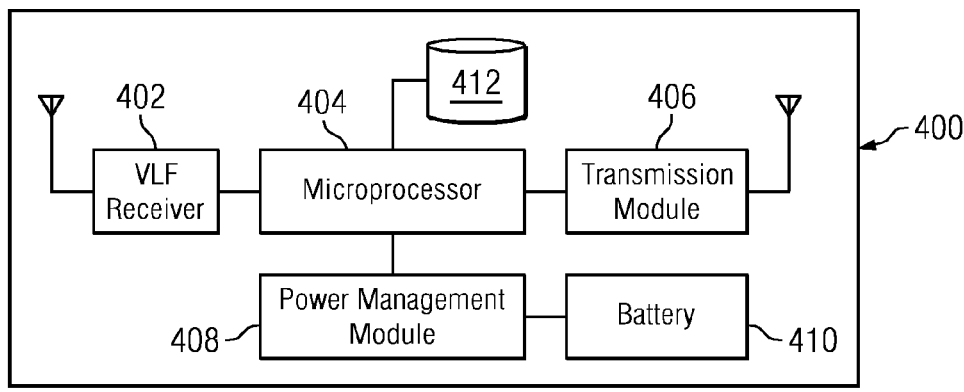
FIG. 4 is a block diagram illustrating the functional components of one wearable tag suitable for use in systems for detecting device utilization disclosed herein.

FIG. 4 is a block diagram further illustrating the functional aspects of an active RFID device 400 suitable for use as a wearable identification tag utilized in a system for tracking device usage. As illustrated, device 400 includes a receiver 402 connected to a microprocessor 404. A power management module 408 and battery 410 may be used to power device 400. A transmission module 406 may be provided to transmit signals from device 400 to other devices in a network.

To conserve power and extend battery life, device 400 is normally maintained in a passive or sleep mode. In one embodiment, module 400 is powered up when receiver 402 detects a transmission in a selected frequency range. The detected transmission may be from a control unit such as detection/identification module 216 (FIG. 3), an entry/exit detector as described below or another monitoring device. When activated, device 400 reads the control unit's identification, stores it in local memory 412 and transmits an information packet to a controller. The information packet may include a time stamp, a unique identification code for device 400 and the identification code of entry/exit detector or control unit.

Figure 5:
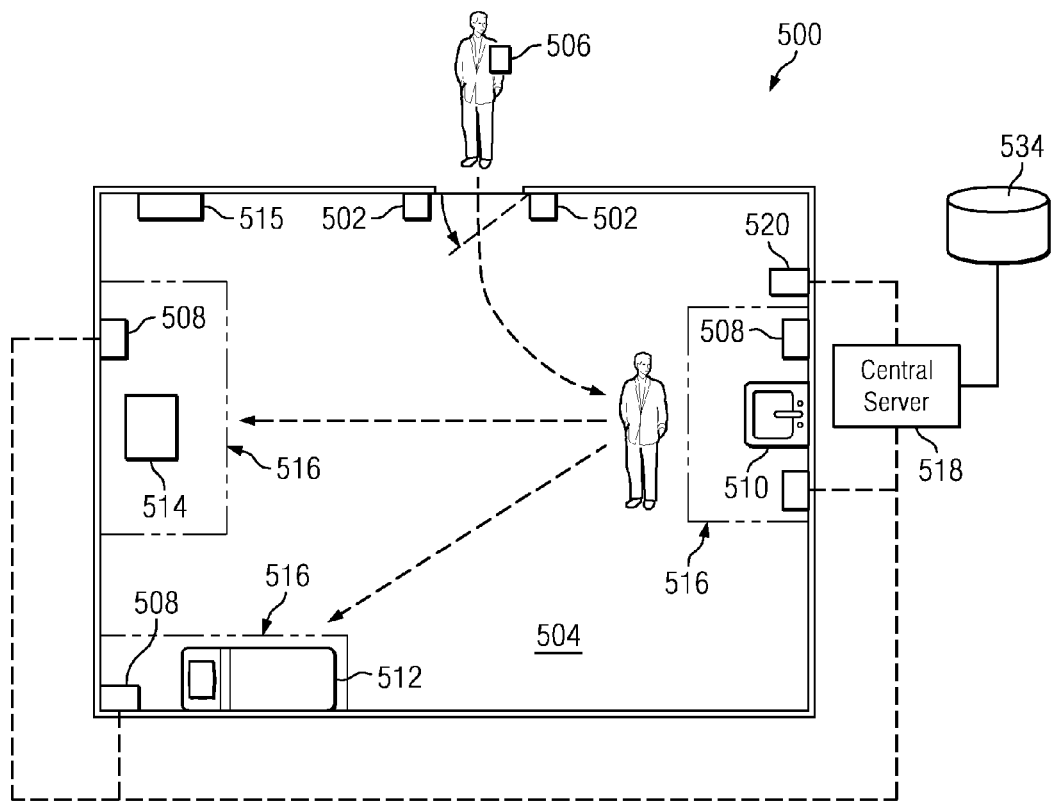
FIG. 5 is a schematic representation of one embodiment of a system for detecting device utilization.

Referring now to FIG. 5, in one embodiment, a system 500 according to the invention includes entry/exit detectors(s) 502 for detecting the entry and exit of personnel to and from a room 504 in a facility such as a hospital or other health care facility. Entry/exit detector(s) 502 may utilize infrared sensors, photo diodes or similar detectors to detect when an individual enters or exits room 504. In one embodiment, entry/exit detector 502 may be a reflected infrared beam across a doorway. In another, entry/exit detector 502 may utilize a passive overhead infrared detector.

Entry/exit detectors 502 may also incorporate router/coordinator functions for the network such that the detectors can "wake up" a user tag 506 with a radio frequency signal, receive and transmit a data packet from the tag or a control unit 508 associated with a monitored device such as a hand washing or cleansing station 510, a patient bed 512, or another device 514. In an embodiment where entry/exit detectors 502 incorporate the router/coordinator function, entry/exit detectors 502 may retransmit data packets generated within the system. In alternate embodiments, the router/ coordinator function may be implemented in wall mounted units 515 spaced at selected intervals to cover a desired amount of space, for example from 1000-2000 square feet.

Referring further to FIG. 5, control units 508 associated with different devices may have associated functional zones 516 wherein the control units can transmit a low power directional radio frequency signal to "wake up" a user tag 506 within the respective zone and receive and/or compile and transmit a data packet including data from tag 506. In one embodiment, a control unit 508 may "wake up" upon a sensed event; for example, entry of a person into room 504 detected by entry/exit detectors 502. The range of the signal transmitted by a control unit 508 may be limited to for example, 5, 10 or 15 feet to ensure that only tags 506 within a particular zone 516 are activated.

In one embodiment, a control unit 508 and/or user tag 506 may transmit data to a site or central server 518 via a network bridge 520. Network bridge 520 may translate data packets received from control unit 508 or tag 506 to TCP/IP in a wired or wireless Ethernet format. Server 518 stores the transmitted data in a database on a data storage device 534 associated with the server. The stored data may include the identity of the user tag, the identity of the particular device associated with a control unit and a time stamp for the particular event for future use. Events may include entry or exit from room 504, a hand washing event or an error event such as a low battery condition of a user tag.

Figure 5A:
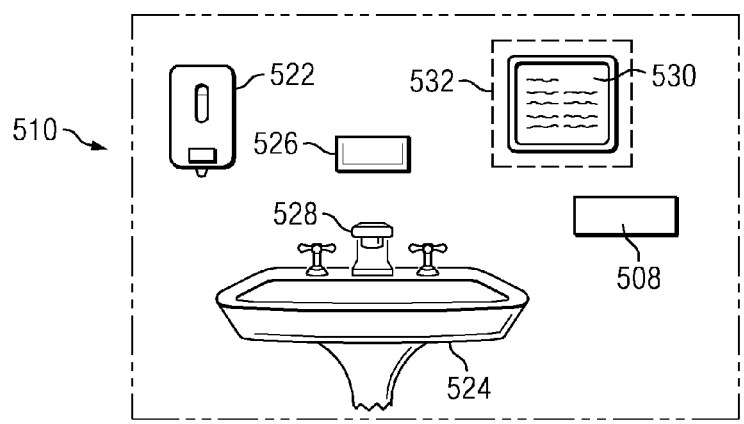
FIG. 5A is a more detailed representation of a monitored device of FIG. 5.

Turning now to FIG. 5A, an exemplary hand washing or cleansing station 510 includes a soap or cleanser dispenser 522, a sink 524 having a faucet 528 and a sensor 526 for detecting the proximity of a user's hand within a predetermined distance from the sensor 526. In this embodiment, sensor 526 detects only the proximity of a user's hand rather than whether the user has dispensed soap or a cleanser from dispenser 522 or turned on a faucet 528 in sink 524. A control unit 508 is operatively connected to central server 518 (FIG. 5) to transmit a data packet with the details of a hand washing event when sensor 526 detects a user hand within the predetermined proximity. The data packet may include identification code of tag 506, a device code associated with station 510 and a time stamp.

Referring further to FIG. 5A, in one variation, a feedback device 530 is positioned adjacent the hand washing or cleansing station 510. Device 530 may be a liquid crystal display, (LCD), light emitting diode display (LED), audio speaker or other type of device suitable to display or communicate the desired information or content to a user of station 510. In different embodiments, feedback device 530 may be activated when sensor 526 detects a user's hand within the predetermined proximity from the sensor. In other embodiments, feedback device 530 may be activated when entry/exit detectors 502 detect the entry of an individual into room 504. The content or material communicated by device 530 may be determined based on the identity of the user associated with a particular user tag 506, the identity of a patient resident in room 504, the device being monitored and/or other factors. In one variation, user, patient and or device information may be stored in a database on a data storage device 534 (FIG. 5) associated with server 518 in order to select the information and content to be communicated. In an embodiment wherein device 530 is a visual display, the device may be configured with a privacy screen or filter 532 such that the information or content presented on the display is only visible to a user of station 510.

The information and content communicated by device 530 may include items of interest to the particular individual such as sports statistics, financial statistics, and similar information that may be of interest to the particular user of tag 506. Presentation of information of interest to the user tends to promote use of station 510, resulting in increased compliance with hand washing or other procedures, depending upon the particular device and user. The information and content may be transmitted from central server 518, control unit 508 or other sources under the control of the server or control unit.

The information presented on feedback device 530 may also include compliance information for the particular user or an average compliance for all users, providing further motivation for compliance with procedures. Although as illustrated, feedback device 530 is associated with a hand washing or cleansing station 510, the feedback device may be associated with other devices, for example a patient bed, an intravenous delivery pump or other machines or devices where it may be desirable to monitor device utilization and/or compliance with procedures.

Referring further to FIGS. 5 and 5A in other embodiments, the information presented or communicated by feedback device 530 may be specific to the patient or patient(s) resident in room 504. For example a physician, nurse or therapist seeing a patient for a certain condition or illness may wish to view one or more of a patient's vital signs or other patient-specific information before initiating contact with or treatment of the patient. A physician may wish to have different information than a nurse or therapist regarding the patient. For example, a physician may wish to see only information indicating abnormal conditions and/or information relevant to a condition for which the patient is being treated. For example, a cardiologist treating a patient with a heart condition may wish to see different patient-specific information than an internist treating a patient for a different condition. Thus, information presented by feedback device 530 may be specific to the patient and/or the specific health care provider.

In other embodiments, feedback device 530 may be a graphical user interface such as a touch screen that enables a user to access selected content or information based upon the user tag 506 identification, the device identification and or the patient identification. For example, a physician may use feedback device 530 to access server 518 to check the medications that the patient has received while a therapist or nurse may use feedback device 530 to determine the last occasion when the patient has received a particular therapy. Further, although as described the system of FIGS. 5 and 5A have been described in connection with the use of devices by individuals, it will be appreciated that a system may employ tags 506 on mobile devices such as intravenous pump units, medicine carts and the like to track the movement of the mobile device into or out of a room 504 or functional zones 516.

Figure 6:
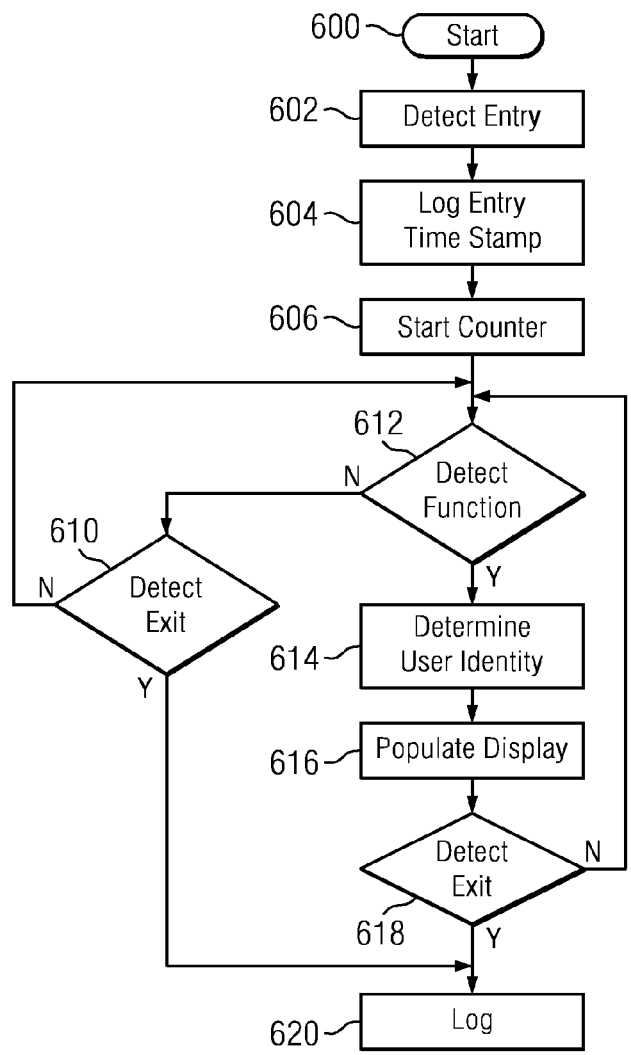
FIG. 6 is a flow chart illustrating one method of determining device utilization using the system of FIG. 5.

FIG. 6 is a flow chart illustrating one method utilizing a system for tracking device usage. The method is initiated at step 600 wherein a system such as described above is powered up. Referring to FIGS. 5, 5A and 6 in conjunction, at step 602 entry of an individual into room 504 is detected with entry/exit detectors 502. If entry/exit detectors 502 incorporate router/coordinator functions for the network, the detectors can "wake up" a user tag 506 carried by the individual with a radio frequency signal and identify the tag based upon a signal generated by the tag. After tag 506 is identified, a data packet including the identity of the tag, the time, the identity of the room and other relevant information may be transmitted from the entry/exit detector to a network bridge 520 which in turn translates the packet and transmits the data to server 518 where data may be stored in a data storage device 534 at step 604.

At step 606 a counter or timer is started to monitor the amount of time the tag wearer is in room 504. At step 610, a determination of whether the user has exited the room is made. If the user has exited the room, the process loops to step 620 where a log entry of the entry and exit is stored. At step 612 a function, such as utilization of a hand washing or cleansing station is detected. At step 614, the user identify is determined based on the identification code of 506.

Based on the identity of tag 506, (e.g. the particular user), the patient identity, the device identity or type, a feedback device 530 such as visual display is populated with information or content at step 616. The information may be based on the user tag identification and/or the identity of the patient residing in room 504 as described above. The information or content may be displayed for a predetermined time period depending upon the particular device being monitored. For example, in the case of hand washing or cleansing station 510, the information may be displayed for thirty seconds, one or two minutes or another selected time period. In other embodiments the information or content may be displayed for as long as the tag wearer is using the particular device.

At step 618, exit of the tag wearer from room 504 is detected with entry/exit detectors 502. The exit event is transmitted to server 518 where the tag identification, device utilization and time stamp may be stored in a data storage device 534 at step 620. Feedback device 530 may be deactivated upon exit detection under the control of server 518 or after a predetermined time.

Figure 7:
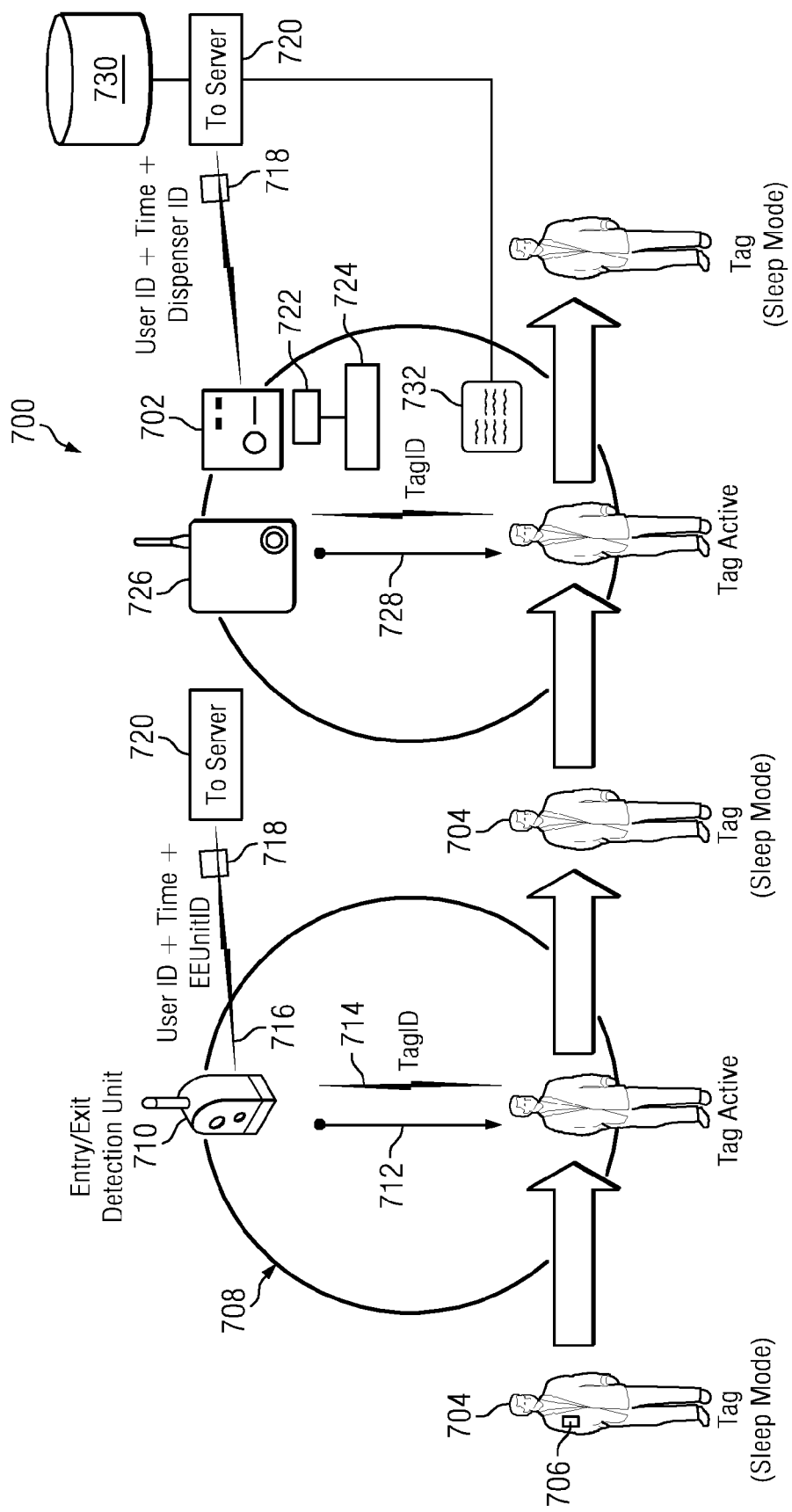
FIG. 7 is a graphical representation of a one mode of operation of a system for tracking device usage.

FIG. 7 is a graphical representation of one mode of operation of a system 700 for tracking device usage. In this embodiment, control unit 702 and/or entry/exit detection sensor 710 may function as router/coordinators. A user 704 carrying or wearing a tag 706 in the sleep mode is detected entering a room or area 708 by entry/exit detection sensor 710. The entry/exit detection sensor 710 generates signal 712, including a unit identifier. The signal 712 activates tag 706 which in turn generates a signal 714 received by entry/exit detection sensor 710. The signal generated by tag 706 includes the tag identification number or code which the entry/exit detector transmits in signal 716 along with a time stamp and a unit identification number or code to a site or central server 720 via a network bridge 718. The signal generated by entry/exit detection sensor 710 may be directional and/or range limited over area 708 such that only a tag 706 in area 708 is activated. For example, the power of the signal may be limited such that a tag must be within 5, 10 or 15 feet of the entry/exit detector in order to receive the signal. In other variations the entry exit detector is provided with a highly directional antenna to range limit the signal.

As user 704 moves out of area 708, tag 706 returns to the sleep mode until reactivated. For example, if user 704 places his hands into proximity with a sensor 722 with a hand washing or cleansing station 724 a transmitter 726 responding to a signal from the sensor may generate a directional and/or range limited signal 728 to activate tag 706. Tag 706 responds with a signal received by control unit 702 with the tag identity code. Control unit 702 may then transmit the tag identification along with a time stamp and its unit identification to a site or central server 720 via network bridge 718. Upon receiving the tag identification, server 720 may access a database 730 to determine what information or content should be presented to user 704 on a display 732 associated with the particular device, for example, hand washing or cleansing station 724. In other variations control unit 702 may route a scripted message or content to display 732.

Figure 8:
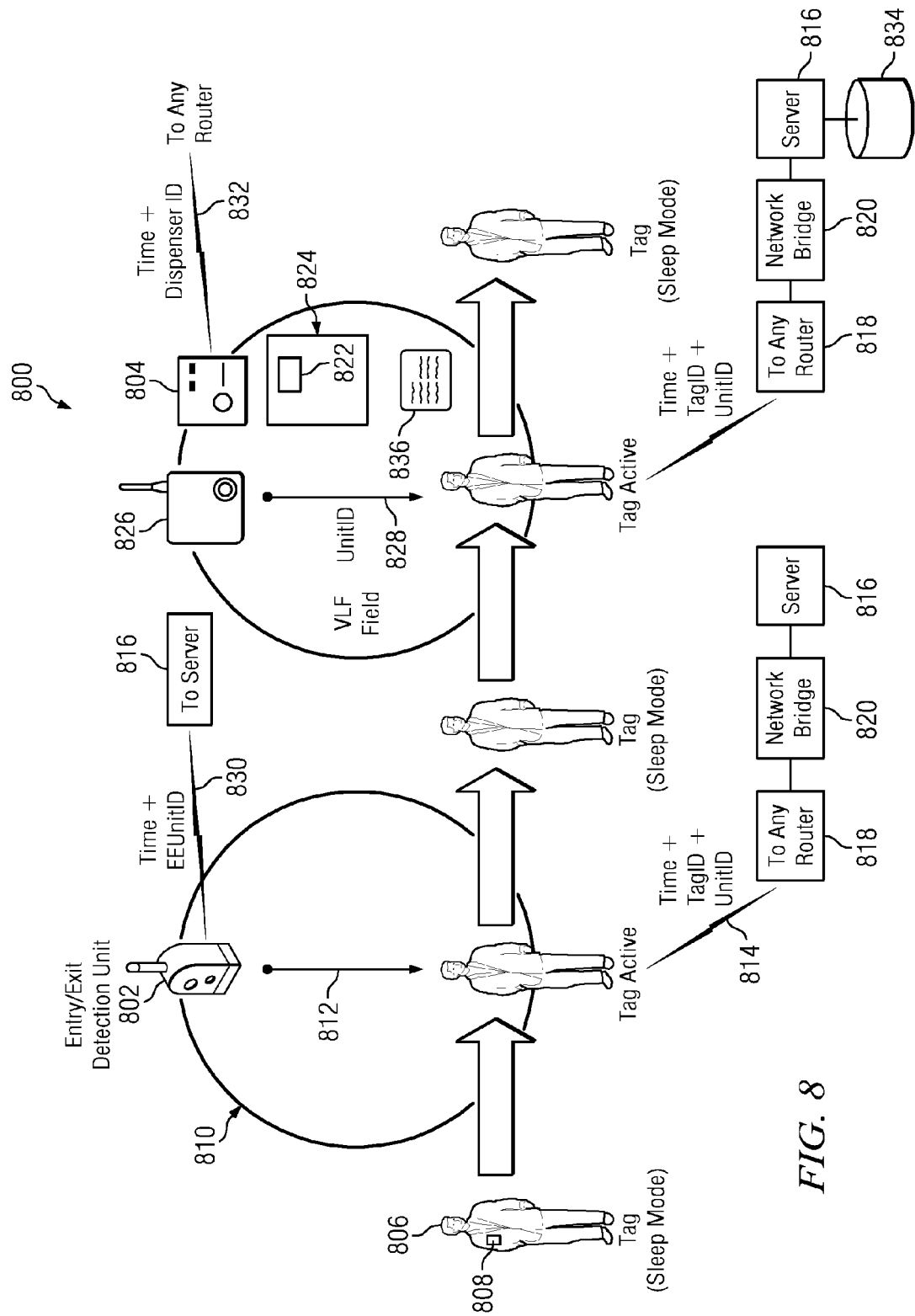
FIG. 8 is a graphical representation of an alternate mode of operation of a system for tracking device usage.

FIG. 8 is a graphical representation of one mode of operation of a system 800 for tracking device usage wherein entry/exit detection units 802 and controller 804 may be configured as endpoints in the system network. In this embodiment, more intelligence is moved into a tag 808 worn or carried by a user 806. The operation begins when entry/exit detector 802 detects a user 806 entering a room or area 810. The entry/exit detector 802 generates a directional and/or range limited signal 812 including a unit identifier for the entry/exit detector. The signal 812 activates tag 808 which in turn stores its own identity, the identity of entry/exit detector 802 and a time stamp in memory until the data can be transmitted on signal 814 to a site or central server 816 via any available router 818 and/or network bridge 820.

As a backup, and for data verification, entry/exit detector 802 may transmit a time stamped signal 830 of the entry or exit event to the site or central server 816. If the data packet transmitted by tag 808 includes corrupt unit identification for entry/exit detection unit 802, server 816 may correlate the time stamped signal 830 with the identity of tag 808 to preserve a record of the entry or exit event.

As illustrated, tag 808 returns to the sleep mode until reactivated. For example, if user 806 places his hands into proximity with a sensor 822 with a hand washing or cleansing station 824 or other monitored device, a transmitter 826 responding to a signal from the sensor may generate a range limited signal 828 to activate tag 808. Upon receiving signal 828, tag 808 in turn stores its own identity, a unit identity corresponding to hand washing or cleansing station 824 and a time stamp in memory until the data can be transmitted to a site or central server 816 via any available router 818 and/or network bridge 820 after which tag 808 may return to the sleep mode. As a backup, and for data verification, controller 804 transmits a time stamped signal 832 of the hand washing or other event to the site or central server 816.

In one embodiment, signals 812 and 828 generated by entry/exit detector 802 and transmitter 826 may be unidirectional due to signal power and other considerations. Consequently, tag 808 may not be able to communicate with entry/exit detector 802 and transmitter 826 to verify the accuracy of data received from the units. In these cases signals 812 and 828 may include a code to enable tag 808 to determine data integrity. If the code passes, tag 808 will attempt to transmit the data packet with the unit identification code or codes to control unit 804 and to the site or central server 816 via network bridge 820 and/or router 818.

In one embodiment, the configuration of the system 800 permits intelligence (e.g. firmware, software) to be maintained on tag 808. This in turn reduces the need for additional software logic to be programmed into entry/exit detector 802 and control unit 804. A record of an entry/exit, hand washing or other event may be stored on tag 808 until successfully transmitted to server 816. In one embodiment, tag 808 may be programmed to wake up and attempt to transmit a event data packet stored in memory to server 816 at periodic intervals, for example every 5, 10 or 15 minutes until it receives a signal from the server confirming a successful receipt of the packet.

Upon receiving the tag identification, server 816 may access a database 834 to determine what information or content should be presented to user 806 on a display 836 or other feed back device associated with the particular monitored device, for example, hand washing or cleansing station 824. As previously noted the information presented to 806 may be user specific, patient specific, device specific or based on a combination of the user identification, patient identification and device identification.

Figure 9:
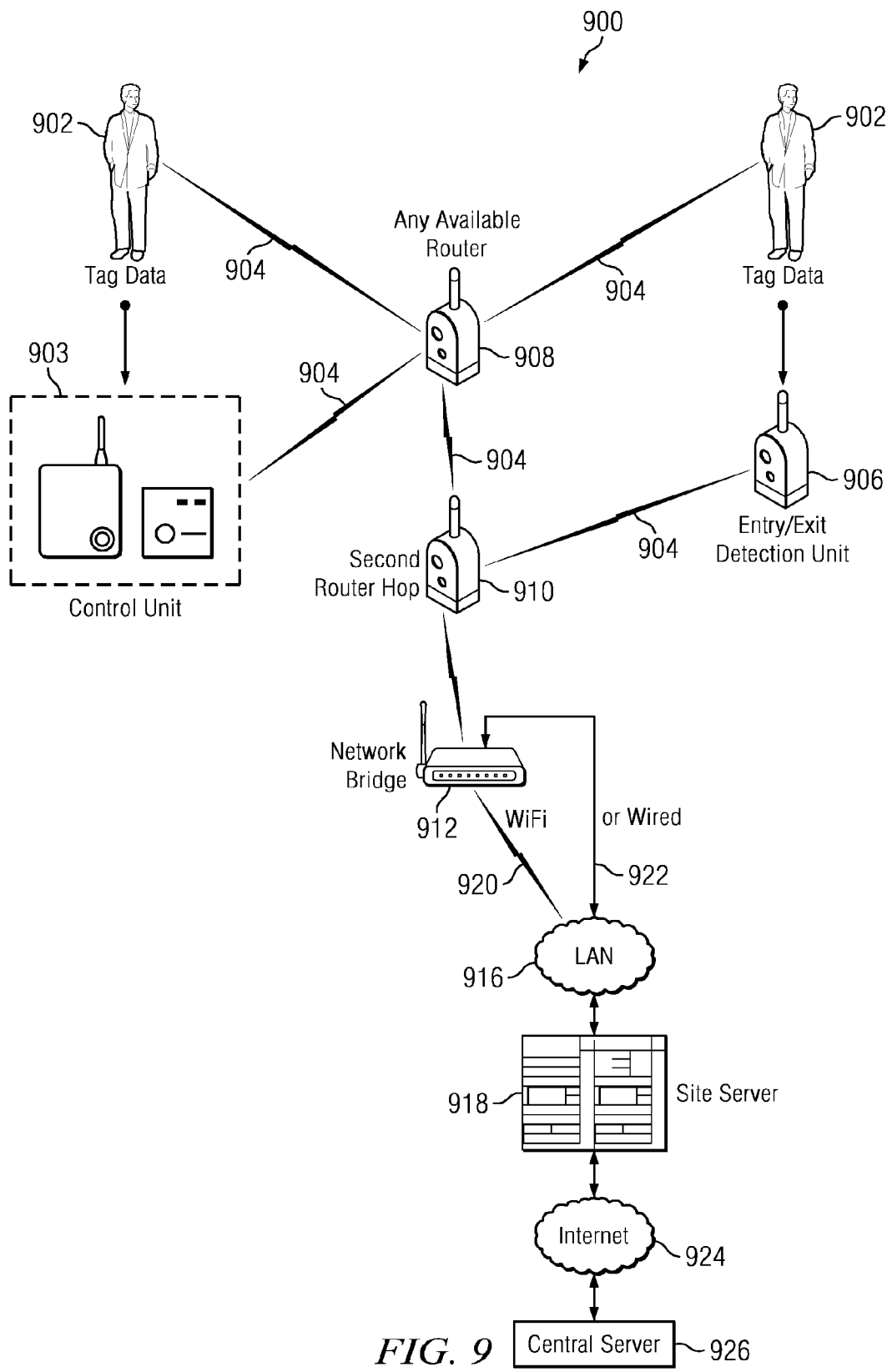
FIG. 9 is a schematic representation of one embodiment of a system and network for tracking device usage.

FIG. 9 is a schematic representation of a system and network 900 for monitoring device utilization. As illustrated data packets 904 from tags 902 identifying devices, users and events may transmitted to control unit(s) 903, entry/exit detection unit(s) 906 and to a first available router 908. As previously described, tags 902 may be activated by a directional radio frequency transmission having a limited range. As illustrated, data packets 904 may be transmitted from first available router 908 to a second available router 910 which in turn transmits the data packets to a network bridge 912. In one variation, network 900 may be a mesh network that permits continuous connections and reconfiguration around broken or blocked paths by "hopping" from router to router until the data destination is reached. Thus, so long as a continuous communications path can be established between various nodes in the network such as tag 902, entry/exit detector 906 and control unit 904 and network bridge 912 with multiple available routers, data packets from the nodes will be transmitted to network bridge 912.

Referring further to FIG. 9, in one embodiment, data packets received by network bridge 912 are translated TCP/IP format and transmitted via a local area network (LAN) 916 to site server 918. The data packets may be transmitted as a wireless signal 920 or a wired Ethernet signal 922. In one embodiment, site server 918 processes and transmits the data via the internet 924 to a central server 926 for further processing and use.

Figure 10A:
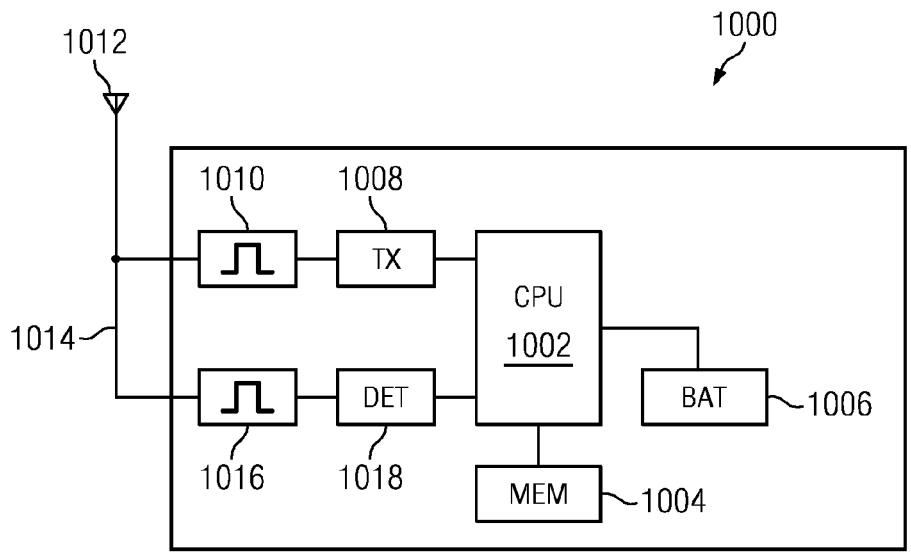
FIGS. 10a-10d are schematic representations of one embodiment of a user tag for use in accordance with the disclosure.
Figure 10B:
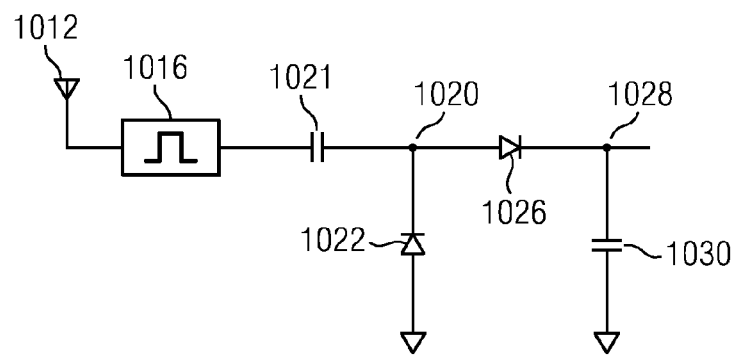

Referring now to FIGS. 10a-10b there are illustrated diagrammatic views of the tag 1000. As described herein above, tag 1000 is a wearable tag. There are many types of tags that could be implemented. These are typically referred to as Radio Frequency ID (RFID) tags since they utilize a unique identification number for each tag such that the wearer can be identified by such. They all utilize a wireless RF link for transmission of that ID to a central station having a receiver which is typically located in close proximity thereto.

There are a number of different types of RFID "tags" that can be utilized. There are passive tags and active tags. A passive tag is typically a tag that does not have a battery associated therewith. With these passive tags, the tag is illuminated with an RF source and the energy from that RF source is utilized to charge up a capacitor to power the device. Once the device is powered, it can then transmit out a very short signal indicative of a stored unique code associated with that RFID tag. Other information could also be provided in the transmission. The active tags are typically powered by an internal battery which can be replaceable or, alternatively, the tag could be disposable. In any event, when these tags are activated by some mechanism, they will power up and transmit information in a short burst. Typically, this transmission is not bidirectional, i.e., there is no handshake with a central controller; rather, they typically broadcast the ID multiple times and it is the responsibility of the receiving device to receive the information accurately.

Referring further to FIG. 10a, there is illustrated a more detailed diagrammatic view of an active tag 1000. This active tag typically contains some type of Central Processing Unit 1002 at the heart thereof. However, it should be understood that the CPU 1002 could be replaced with standard combinatorial logic to achieve the same function. The CPU 1002 is an instruction based device and it has associated therewith a non-volatile memory 1004. This non-volatile memory 1004 such as EPROM or Flash is utilized to store the unique code therein. There could also be additional volatile memory, such as DRAM, which could contain other information that was designated as temporary storage. However, the unique ID is typically permanently affixed to a particular tag such that it cannot be changed. The CPU 1002 is powered by a battery 1006. Typically the entire CPU, battery and memory are disposed within a wearable enclosed package such as a "plastic card."

Associated with the CPU 1002 in this embodiment is a transmitter 1008 for transmitting the information stored in memory 1004 which, at the minimum, is a unique ID. However, as noted herein above, there could be additional information transmitted. Therefore, the CPU 1002 generates a modulating signal to modulate the transmitter 1008. Typically, the data rate is very low and an on/off key modulation is utilized that turns the transmitter power on and off in the simplest context. In one embodiment, this transmitter 1008 can operate at a frequency of 2.4 GHz or any other frequency which will be transmitted through a band pass filter 1010 and antenna 1012. Note that this could even utilize an infrared or optical transmission. The CPU 1002 is also able to receive a "wake up" signal from a detector. This is facilitated in the disclosed embodiment by illuminating the tag 1000 with a 5.8 GHz signal (the second harmonic of the transmit signal in one embodiment) which will be received on a second path 1014 from the antenna 1012 to a band pass filter 1016. This band pass filter 1016 will be input to a detector 1018 which will detect the presence of this 5.8 GHz signal. The band pass filter 1010 on the transmit path will typically filter out as much of the second harmonic as possible such that variable energy will be passed through the band pass filter 1016 for detection by the detector 1018. It should be understood that the power level transmitted from the transmitter 1008 is relatively low compared to the illuminating 5.8 GHz signal, such that the detector 1018 will not detect such signals. When the detector 1018 detects energy at the 5.8 GHz level at a sufficient level, the output thereof will be input to the CPU 1002 as a digital signal that will cross a threshold. Typically, the CPU 1002 can be configured with the use of any typical type of microcontroller unit (MCU) or such that it will allow an interrupt to be generated. This type of MCU devices have a "sleep mode" wherein the CPU 1002 is powered down or the instruction process is halted such that power is not utilized. An on-board comparator will typically compare the output of the detector 1018 with a predetermined threshold voltage which, when it exceeds this threshold voltage, will cause an interrupt to be generated and cause the CPU 1002 to again initiate instructions and service that interrupt. Again, the frequency described is by way of example and any wireless connection could be utilized.

In the disclosed embodiment, the signal received at the detector 1018 is a modulated signal utilizing an on/off key modulation wherein the duty cycle of that signal indicates information that can identify a particular transmitting device, i.e., whether it is an entry/exit device or a cleansing station. This will be described in more detail herein below. The CPU 1002, once woken up, will determine the modulated information from the detect path to determine which device had illuminated the tag and then extract from the memory 1004 at least the unique identification number associated therewith and transmit this unique identification number in a broadcast mode from the transmitter 1008 along with the information about the contacting illuminating device. This will be a relatively simple data packet that will be broadcast a predetermined number of times. After this predetermined number of times, the CPU 1002 will then power down and return to the sleep mode to minimize the power drawn from the battery 1006.

Referring now to FIG. 10b, there is illustrated a diagrammatic view of the detector 1018. The detector 1018 is comprised of a capacitor 1021 connected on one side thereof to the output of the band pass filter 1016 and on the other side thereof to a node 1020. A diode 1022 has the cathode thereof connected to node 1020 and the anode thereof connected to ground. An N series diode 1026 has the anode thereof connected to node 1020 and the cathode thereof connected to a node 1028, node 1028 providing the output of the detector 1018 which is connected to the CPU 1002. A capacitor 1030 is connected between node 1028 and ground. The diodes 1022 and 1026 are Schottky diodes to reduce the voltage drop there across, thus increasing the sensitivity of the detector. The detector 1018 with the two diodes 1022 and 1026 is configured as a voltage doubler. This is typically referred to as a "full-wave voltage doubler."

In order to understand the operation of the circuit, examining the operation thereof during successive half cycles will be discussed. During the first negative half cycle, diode 1022 will be forward biased and hold the node 1020 at ground and the right side of capacitor 1021 to ground. This will allow capacitor 1021 to charge to a voltage equal to the peak voltage ($v_p$) of the RF signal output by the band pass filter 1016 with the left side of capacitor 1021 being negative with respect to ground. During the following positive half cycle of the RF signal received from the output of the band pass filter 1016, diode 1022 will be reverse biased and therefore will not conduct current. The voltage on the input or left side of capacitor 1021 will be at $v_p$ and this will "boost" the other side of the capacitor which is already charged to a voltage of $v_p$ thereacross to a voltage on node 1020 of $2v_p$. Since capacitor 1030 is not charged, this will forward bias diode 1026 and transfer charge from capacitor 1021 to capacitor 1030 until the voltage on node 1028 is equal to $2v_p$.

Figure 10C:
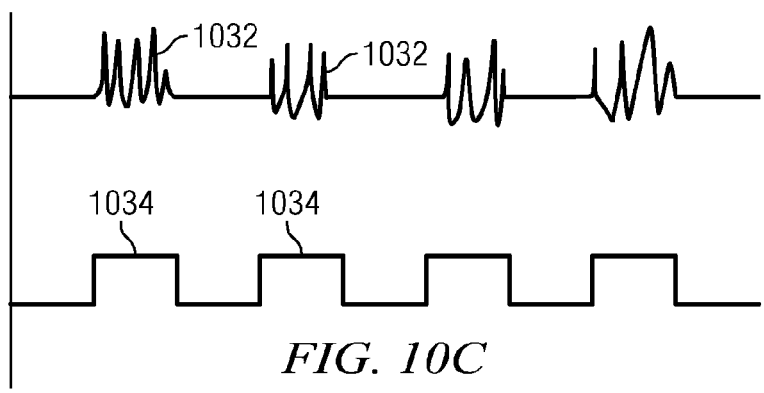

Referring now to FIG. 10c, there is illustrated a diagrammatic view of the waveform on the output of the band pass filter 1016 and the output of the detector on node 1028. The modulated signal is an on/off key modulation and, therefore, there will be a plurality of RF pulses 1032 with a defined pulse width. These will be detected to provide pulses 1034 on the output of the detector on node 1028 substantially equal in pulse width to the width of the RF pulses 1032. The duty cycle of these pulses is how the coding is determined. Therefore, the coding is a relatively simplistic code that can only be distinguished between a small number of different devices. It may be that one device has a 30% duty cycle and another device has a 70% duty cycle. Therefore, all that is necessary for the CPU 1002 to accomplish this is to start a counter and count a number of clock cycles of the CPU 1002 during which the output of the detector 1018 is high. This will allow a particular device to be uniquely identified such that the CPU 1002 now has knowledge of information associated with an illuminating device. This will be transmitted out from the tag 1000, i.e., a "1" for an entry/exit unit and a "0" for a cleansing unit.

Figure 10D:
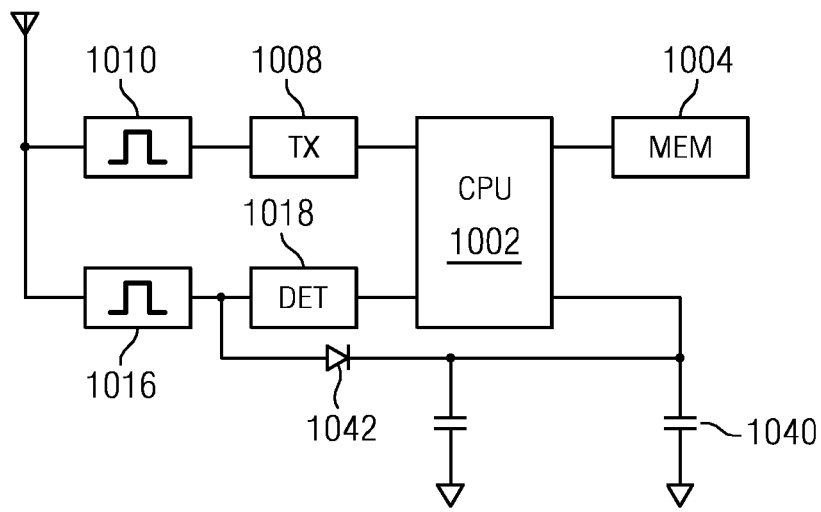

Referring now to FIG. 10d, there is illustrated a diagrammatic view of an alternate embodiment wherein the device is a passive tag in that the illuminating power is required to charge up a capacitor 1040 through a peak detector 1042 comprised of a diode which is in series with the output of the band pass filter 1016 and the power supply side of the capacitor 1040. This requires the illuminating power to be on for a much longer period of time and the response of the diode 1042 in series with the capacitor 1040 is much slower than the response of the detector 1018 such that the device can be powered. In this particular embodiment, upon power up, the CPU 1002 will automatically look at the detector such that the detector 1018 need not provide any type of interrupt signal thereto. The CPU 1002 will merely look at the duty cycle on the detect input and then extract from memory 1004 the code and transmit it along with the determined duty cycle information from the detect input to the transmitter 1008 on the 2.4 GHz frequency.

FIG. 11 is a schematic representation of a system 1100 for detecting and identifying device utilization. In one embodiment, the system employs a non-meshed IEEE 802.15.4 standard for wireless personal area networks. A plurality of rooms or areas 1102 may be provided with entry/exit units 1104 including sensors 1106 for detecting a moving object or body entering or exiting the room or area through a doorway 1108. Sensors 1106 may be infrared sensors, vibration monitors, photocells or other devices suitable for detecting the presence of a body or moving object within a doorway 1108. In other embodiments, sensors 1106 may be switches operative to detect when a door 1110 to a room or area 1102 is opened or closed, for example contact switches, magnetic switches, reed switches or similar devices. Each of entry/exit units 1104 may be provided with a processor and transmitter 1116 and a highly directional antenna 1118 for illuminating a predetermined area corresponding generally to doorway 1108 of the room or area 1102 to activate a user tag 1000.

Referring further to FIG. 11, rooms or areas 1102 may be provided with devices such as hand cleaning stations 1120 or other devices or equipment that may be monitored for utilization. A control unit 1122 is operatively positioned and/or connected to stations 1120 to detect when the station is used. Control units 1122 may be provided with sensors 1124 such as capacitive sensors, infrared sensors, contact switches, vibration sensors or other devices suitable for detecting when a user is in proximity to a station 1120 or has physically contacted the station. Control units 1122 may also be provided with a transmitter and processor 1126 and a directional antenna 1128 for illuminating a predetermined area adjacent a given station with a radio frequency to activate a user tag 1000.

Entry/exit units 1104 and control units 1122 are configured to "wake up" and communicate with a network bridge unit 1130 as indicated by arrows 1138. In the embodiment disclosed in FIG. 11, transmissions from entry/exit units 1104, control units 1122 and tags 1000 to bridge unit 1130 are unidirectional, e.g., bridge unit 1130 does not acknowledge reception of the signals. Bridge unit 1130 may translate data packets from entry/exit units 1104, control units 1122 and tags 1000 to TCP/IP format and transmit the information to server 1132. The data packets may be transmitted from network bridge unit 1130 to server 1132 as wireless signals or over a wired local area network. Server 1132 may be provided with an associated memory 1134 for storing records of transmissions received by the server. Server 1132 may also be configured to select and transmit video and/or audio content 140 to displays 1136 located in rooms or areas 1102.

FIG. 12 is a flowchart illustrating one method of operation of the system described in FIG. 11. Referring to FIGS. 11 and 12 in conjunction, the process begins at step 1200 with entry/exit unit 1104 in a low power "sleep" mode. At step 1201 sensor 1106 detects a moving body or individual in doorway 1108, and "wakes up" entry/exit unit 1104 at step 1202. Entry/exit unit 1104 then illuminates the doorway at step 1203 and "wakes up" tag 1000 at step 1204. In one embodiment, entry exit unit 1104 then illuminates a predetermined area generally corresponding to door 1108 with a highly directional 5.8 GHz signal at step 1210. Entry exit unit 1104 may transmit a 5.8 GHz signal for a predetermined period or may transmit the signal multiple times, for example 3, 5 or more times within a predetermined period to increase the probability that the signal is received by tag 1000. After transmitting the 5.8 GHz signal, entry/exit unit 1104 may return to a low power "sleep" mode. In other embodiments, entry exit unit 1104 may continuously illuminate doorway 1108, thereby eliminating the need for sensor 1106.

Referring still to FIG. 12, at step 1205, tag 1000 selects a preprogrammed message and transmits the message to entry/exit unit 1104 or control unit 1122 at step 1206. In one variation, the signal from entry/exit unit 1104 is modulated (for example by varying the duty cycle) such that tag 1000 can identify the signal as originating from an entry/exit unit. Thus tag 1000 may be preprogrammed with "canned" messages corresponding to the device (e.g. an entry/exit unit or a control unit) that illuminated the tag. The message transmitted by tag 1000 may also contain a unique identification number assigned to the tag, the battery status of the tag and may include additional information depending upon the specific application. After transmitting the signal at step 1207, the tag returns to a passive or "sleep" mode at step 1207.

Entry/exit unit 1104 then transmits a signal to bridge unit 1130 at step 1208 indicating that the unit has been "awakened" from the sleep mode. Bridge unit 1130 may then translate the transmission to TCP/IP format and forward the data to an IP address associated with server 1132 at step 1209. The data transmission or packet may be time stamped by bridge unit 1130 and/or server 1132. In one embodiment, bridge unit 1130 is configured to translate the data packet transmitted by tag 1000 to TCP/IP format and to transmit the translated transmission to an IP address associated with server 1132. The data packet may be time stamped by bridge unit 1130 and/or server 1132. The timing of the transmissions from entry/exit unit 1104 and from tag 1000 may be used to identify the specific entry/exit unit that activated tag 1000. Information and data transmitted from bridge unit 1130 to server 1132 may be saved in database in memory 1134 for correlation, processing, and future use such as report generation. One or more bridge units 1130 and server or servers 1132 may be collectively viewed as a network for collecting and providing information regarding device utilization.

The user of tag 1000 proceeds to cleaning station 1120 (or another monitored device) and is detected by sensor 1124 at step 1210 which wakes up control unit 1122 at step 1211. As previously noted, sensor 1124 may be a capacitive sensor, an infrared sensor, a contact switch, vibration sensor or other device suitable for detecting when a user is in proximity to a station 1120 or has even physically contacted the station. At step 1212, control unit 1122 illuminates a predetermine area adjacent the monitored device with a range limited directional radio frequency signal and "wakes up" or activates tag 1000 at step 1213. The signal transmitted by control unit 1122 may be modulated to enable tag 1000 to distinguish the signal from signals transmitted by entry/exit units 1104. Signals from control units 1122 associated with different monitored devices may be similarly modulated to distinguish control units associated with different monitored devices.

Tag 1000 is awakened from the low power or "sleep" mode at step 1213 by the 5.8 GHz signal transmitted by control unit 1122. Based upon the modulation of the 5.8 GHz signal, tag 1000 may select and transmit a preprogrammed "canned" message at step 1214. In one embodiment, the signal transmitted by tag 1000 is a 2.4 GHz signal and may be transmitted multiple times, for example three times, and/or for a predetermined time period to increase the probability that the signal is received by bridge unit 1130. After transmitting the 2.4 GHz signal the tag returns to the sleep mode at step 1215 until receiving a signal from another control unit or from an entry/exit detector.

Bridge unit 1130 receives the 2.4 GHz transmission from tag 1000 and transmits the information to server 1132 at step 1217. As previously noted, bridge unit 1130 may be configured to translate the data packet transmitted by tag 1000 to TCP/IP format and to transmit the translated transmission to an IP address associated with server 1132. The data packet may be time stamped by bridge unit 1130 and/or server 1132. The timing of the transmissions from control unit 1122 and from tag 1000 may be correlated to identify the specific control unit 1122 that activated tag 1000. The information transmitted at step 1217 may be stored on a database in memory 1134.

In one embodiment, server 1132 identifies the user of tag 1000 based upon the unique identification number of tag 1000 at 1218. In this variation, server 1132 may be preprogrammed to identify selected content to populate display 1136 in room or area 1102 at step 1219 based on identification number of tag 1000 worn by a specific user and possibly based also on the patient occupying the room, etc. At step 1220 the selected content is transmitted to display 1136 and displayed to the user at step 1221. Display 1136 may be mounted or positioned adjacent to, or in proximity with, cleaning station 1120 or another monitored such that the display is only visible to the user of the station or monitored device.

The content transmitted by server 1132 to display 1136 for viewing by a user on the display may be specific to the user of the tag, a patient or both. For example, vital signs such a blood pressure and heart rate may be presented on the display. In some embodiments, only abnormal vital signs or other conditions of interest to a practitioner may be displayed. In other embodiments, compliance information, for example compliance with hand washing or other protocol, for the particular user and/or the average compliance of all users may be displayed, providing motivation for compliance with procedures. In yet other embodiments, the content presented on the display may include items of interest to the tag wearer, such as sports or financial statistics or similar information. The content may be displayed for a predetermined period or until entry/exit unit 1104 detects the user leaving room or area 1102.

At step 1222 sensor 1106 of entry exit unit detects the presence of a moving object or body in doorway 1108 as user 1142 exits the room or area 1102. Steps 1222 through 1228 are essentially the same as steps 1203 through 1209, i.e., the entry exit unit signals the bridge unit 1130 that it has been awakened from a low power sleep mode and then illuminates doorway 1108 with a radio frequency signal to "wake up" tag 1000, after which it returns to the low power sleep mode. Tag 1000 identifies the signal as originating from an entry/exit unit based upon the modulation of the signal and selects and transmits a preprogrammed message that is received by bridge unit 1130, translated to TCP/IP format and transmitted to server 1132. At step 1229, server 1132 may correlate and store a record of the "event" in database in memory 1134. The record or records may include the entry of a user into room 1102, identity of the user, detection of the user at cleaning station 1120 or other monitored device and the exit of the user from room 1102. The event records may be time stamped to facilitate use of the data. The stored data may include the status of battery 1008 (FIG. 10) so that the battery may be replaced when the power level of the battery drops to a predetermined level. The process ends at step 1272.

Figure 13:
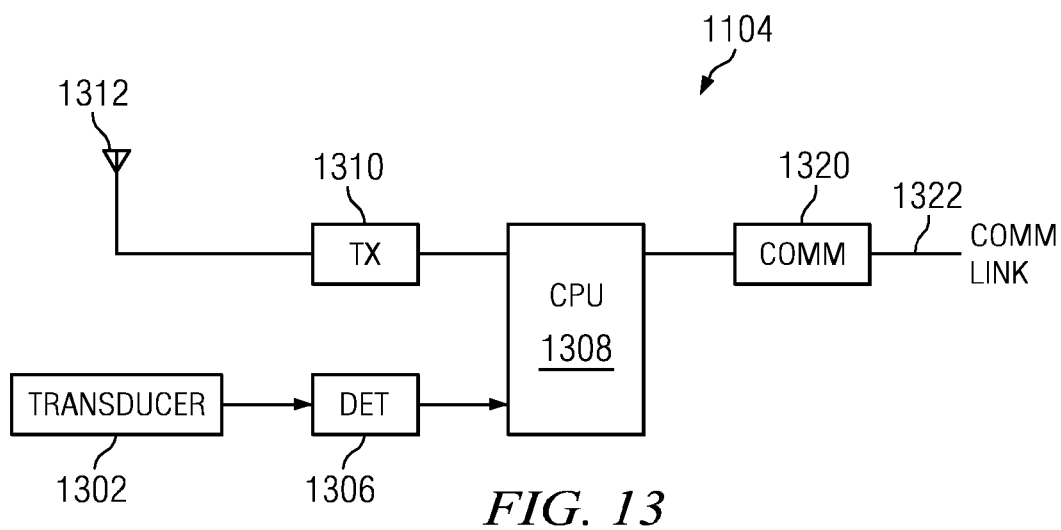
FIG. 13 illustrates a diagrammatic view of the entry/exit detector.

Referring now to FIG. 13, there is illustrated a diagrammatic view of the entry/exit detector or unit 1104. These entry/exit detectors or units 1104 utilize some type of transducer 1302 for detecting the presence of an individual. As noted herein above, these could utilize an optical beam, an infrared detector, a motion sensor or any type of device. Basically, the transducer 1302 will be powered up on a constant basis and whenever any type of movement or passage is detected through a defined region, a signal will be generated to a detector 1306 and this will be input to a CPU 1308. Again, the CPU 1308 could be a microcontroller unit (MCU) and this could be powered up on a constant basis or it could be battery powered such that it would operate in a sleep mode. However, if there is sufficient power, the CPU could be in the constantly on mode to monitor the output of the detector 1306. In fact, the detector 1306 could be implemented internal to the CPU 1308 if the CPU had sufficient analog/digital capabilities. The CPU 1308, upon it receiving indication that movement has occurred or that an object has passed by the entry/exit, a signal can be generated to activate a 5.8 GHz transmitter 1310 to transmit on an antenna 1312 an illuminating signal. As noted herein above, this signal can be modulated with a predetermined duty cycle to identify a particular entry/exit unit. Of course, as noted herein above, there are probably a finite number of duty cycles that can be discriminated with the tag. It should be understood that other types of coding techniques, such as a digital code, could be transmitted via a pulse width modulation scheme or even on/off key modulation scheme and broadcast this particular code. This could be a 4-bit code, an 8-bit code or even higher to allow the tag 1000 to distinguish between multiple entry/exit units or device units. In any event, the CPU 1308 provides this modulation by turning the transmitter 1310 on and off at the predetermined times to encode the information thereon and provide the illumination. The power level of the transmitter 1310 is sufficient to provide information at that frequency to activate the internal detector of the tag 1000. This information is broadcast for a predetermined amount of time, it being noted that the CPU 1308 in the entry/exit unit 1104 does not have the capability of receiving information from the tag such that there is no ability for the CPU 1308 to know the tag was actually on the wearer. The CPU 1308, upon completing the illumination cycle or just on receiving the detection, will send a communication through a communication device 1320 along a communication link 1322 to the bridge unit 1132. This COM unit 1322 could be a wireless link or hard wired link. It could be formatted with a standard Ethernet format or it could be TCP/IP protocol such that a packet of data is transmitted on a network with a defined URL of a destination unit 1132. The purpose of the entry/exit unit 1104 is merely to receive an indication that some event has occurred, which turns on the illumination unit in the transmitter 1310 and then provides an indication to the bridge unit that illumination has occurred. This is substantially identical to the proximity sensor disposed on any device such as the cleansing station.

Figure 14:
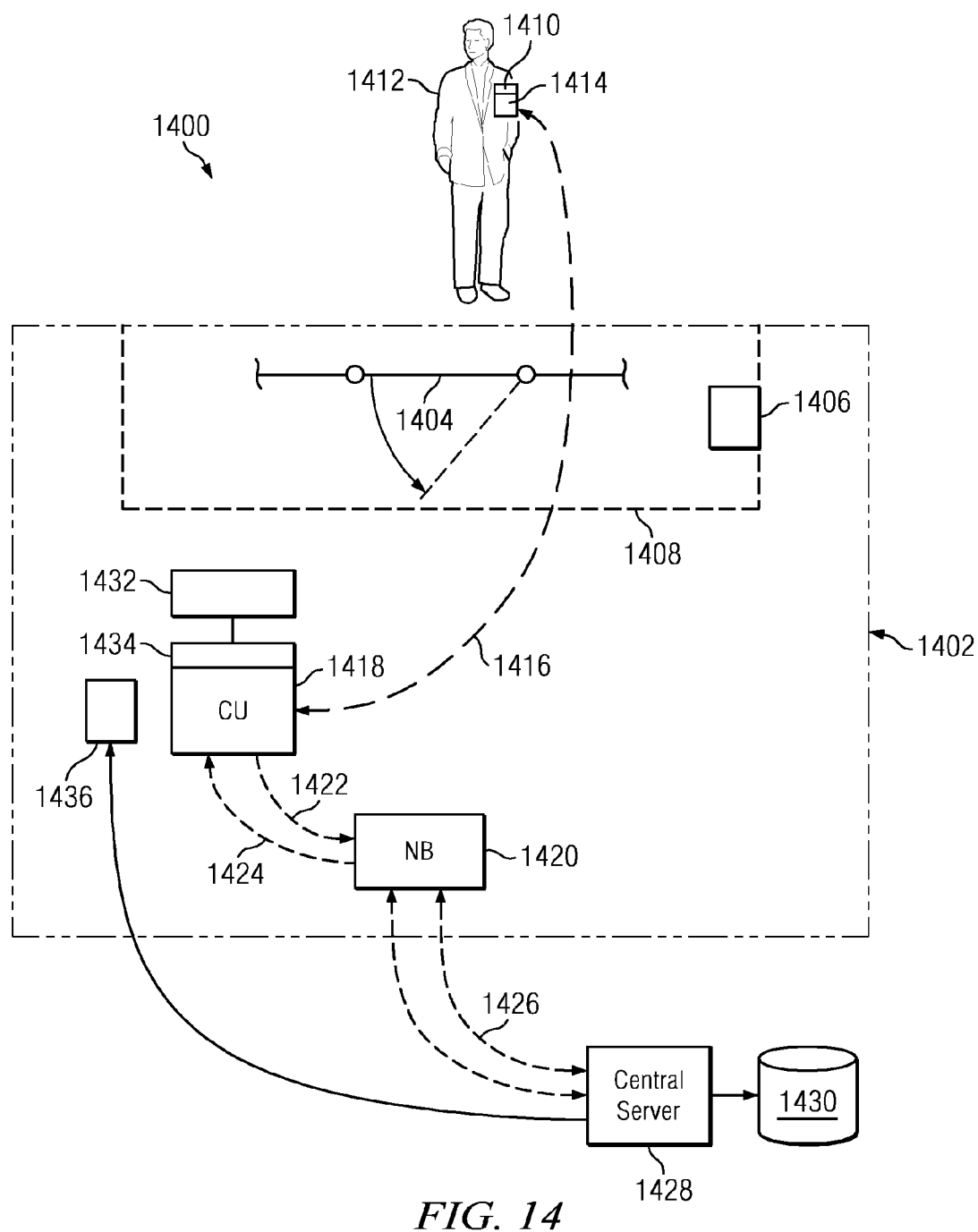
FIG. 14 is a schematic representation illustrating yet another alternate system for monitoring device usage.

FIG. 14 is a schematic representation of another embodiment a system for tracking device usage generally designated as 1400. In this embodiment, an area 1402 such as a hospital room is accessed through a doorway 1404 equipped with a limited range entry/exit RF transceiver 1406 that continuously transmits an RF signal over a limited area 1408 that includes doorway or entrance 1404. The signal may contain a unique identification code associated with the particular area 1402 or 1408. The range of the RF signal generated by transceiver 1406 may be limited by means of a directional antenna and/or limiting the power supplied to the transceiver. The RF signal generated by transceiver 1406 is set a frequency to "wake up" or activate a passive or active RFID tag 1410 in a wearable user badge 1414 carried by the user 1412 or attached to a device such as a bed, IV unit or similar device. The range of the RF signal generated by transceiver 1406 is limited to avoid activating tags outside of the area of interest, in this case doorway 1402.

Referring still to FIG. 14, when a RFID tag 1410, for example in a wearable badge carried by a user 1412 passes through doorway 1402, the tag is activated by the signal generated by RF transmitter 1406 and generates an RF signal represented by arrow 1416. Signal 1416 may include a unique identification code associated with the particular tag, an identification code associated with the particular device that awakened it, battery status and other information. Signal 1416 may be transmitted multiple times at random or preselected intervals to avoid crossover or interference with other signals generated by different units. In one embodiment, signal 1416 may be transmitted multiple times until transceiver 1406 receives a return signal ('handshake") from control unit 1418 confirming a successful transmission.

After receiving signal 1416, control unit 1418 transmits the signal to a router or network bridge 1420 as represented by arrow 1422. In one variation, control unit 1418 will transmit signal 1422 multiple times until a confirmation message ("handshake") represented by arrow 1424 is received from network bridge 1420. Upon receiving the transmission, network bridge 1420 will transmit the signal to a central server 1428 which saves the information on an associated data storage device 1430 for further use. As will be appreciated, the format and content of the transmissions may be changed as the information is transmitted from the entry/exit control unit 1418 to network bridge 1420 and to central server 1428. For example, time stamps may be attached to the transmissions to enable better tracking of activities.

In one embodiment, control unit 1418 is associated with a particular monitored device 1432 in area 1402, for example a hand cleansing station, a patient monitor or a device such as IV unit. One or sensors 1434, for example contact switches, proximity detectors, motion or vibration detectors, pressure switches or the like may be used to detect use of the monitored device 1432. Sensor 1434 is operatively connected to control unit 1418 to transmit a signal to the control unit indicating use of the monitored device. Upon detecting use of device 1432, control unit 1418 transmits an RF signal to "wake up" or activate user tag passive or active RFID tag 1410 in a wearable user badge 1412. Upon activation, tag 1410 responds with a transmission including its identification number and any other relevant information, for example, its battery status and the identification code of the device that activated the tag. The transmission is received by control unit 1418 which in turn transmits the information to server 1428 via network bridge 1420.

Upon receipt of a transmission from network bridge 1420 indicating use of monitored device 1432, central server 1428 may provide selected content to a feedback device 1436. Feedback device 1436 may a video display, an audiovisual display, an audio display and may be selected based on the identification number of RFID tag 1410, the identity of the patient, the particular treatment unit, the treatment the patient is receiving or other factors that may be relevant to the particular case.

It will be appreciated by those skilled in the art having the benefit of this disclosure that this method and apparatus for detecting and identifying device utilization provides a system for tracking device usage. It should be understood that the drawings and detailed description herein are to be regarded in an illustrative rather than a restrictive manner, and are not intended to be limiting to the particular forms and examples disclosed. On the contrary, included are any further modifications, changes, rearrangements, substitutions, alternatives, design choices, and embodiments apparent to those of ordinary skill in the art, without departing from the spirit and scope hereof, as defined by the following claims. Thus, it is intended that the following claims be interpreted to embrace all such further modifications, changes, rearrangements, substitutions, alternatives, design choices, and embodiments.

What is claimed is:

1. A system for detecting the use of a monitored hand hygiene device, the system comprising:
    an exit/entry detector for detecting an individual entering a room, the exit/entry detector incorporating a transmitter for transmitting a first range limited signal over a limited area upon detecting the individual entering the room;
    a tag wearable by an individual operable in a low power sleep mode and in an active mode, the tag including a receiver configured to receive the first range limited signal or a second range limited signal in a sleep mode and switch to an active mode in response thereto to transmit a signal with a transmitter wherein the signal includes at least an identification code from which a health care provider role of the individual associated with the tag may be determined;
    a control unit including a sensor for detecting a parameter indicating use of the monitored hand hygiene device, the control unit incorporating a receiver and a transmitter for transmitting the second range limited signal upon detecting the parameter indicating use of the monitored hand hygiene device whereby the tag is activated by the transmitted second range limited signal from the control unit to transmit the signal to the receiver with its associated transmitter wherein the signal includes at least the identification code;
    a feedback device in proximity to the monitored hand hygiene device, the feedback device providing the individual using the monitored hand hygiene device with health condition information specific to health conditions for which a patient in the room is being treated and to the health care provider role associated with the tag of the individual wherein the health condition information is provided upon the control unit receiving the signal transmitted from the tag in response to the tag receiving the second range limited signal; and
    a network including a server, the server operable to receive information from at least the tag.

2. The system of claim 1, wherein the exit/entry detector comprises one of a reflective infrared detector, an overhead infrared detector, a vibration sensor or a contact switch.

3. The system of claim 1, wherein the signal transmitted by the tag further includes an identity of the exit/entry detector and a time stamp.

4. The system of claim 1, wherein the monitored hand hygiene device comprises a hand cleansing station and wherein the sensor for detecting the parameter indicating use of the monitored hand hygiene device detects the individual's hand within a pre-determined area adjacent the hand cleansing station.

5. The system of claim 1, wherein the network is configured to translate information received from the tag to TCP/IP format.

6. The system of claim 1, wherein the sensor for detecting the parameter indicating use of the monitored hand hygiene device comprises one of a capacitive-sensing sensor, an infrared detector, a vibration sensor, an electro-mechanical contact switch, or a pressure sensor, the sensor detecting the individual's hand at or within a predetermined area adjacent the monitored hand hygiene device.

7. A system for detecting the use of a monitored hand hygiene device in a room or area, the system comprising:
    a tag wearable by an individual operable in a low power mode to receive a first illumination signal and operable in an active mode upon receiving the first illumination signal to transmit an identification signal identifying the tag and wherein the identification signal includes an identification code from which a health care provider role of the individual associated with the tag may be determined;
    a control unit associated with the monitored hand hygiene device, the control unit including a receiver and a transmitter for transmitting the first illumination signal, wherein the control unit is connected to a sensor operable to detect a parameter indicating use of the monitored hand hygiene device, the control unit transmitting the first illumination signal over a limited, predetermined area upon detection of the parameter indicating use of the monitored hand hygiene device whereby the tag is activated to transmit the identification signal to the receiver;
    a network operable to receive information from one or more of an exit/entry detector, the control unit or the tag, the network configured to translate information received from the tag to TCP/IP format, the network further including a server configured to receive and store the translated information; and
    a feedback device in proximity to the monitored hand hygiene device, the feedback device presenting the individual using the monitored hand hygiene device with health condition information specific to health conditions for which a patient in the room is being treated and to the health care provider role associated with the tag of the individual wherein the health condition information is presented upon the control unit receiving the identification signal transmitted from the tag in response to the tag receiving the first illumination signal.

8. The system of claim 7, wherein the monitored hand hygiene device comprises one of a hand washing or cleansing station in a health care facility.

9. The system of claim 7, wherein the sensor for detecting the parameter indicating use of the monitored hand hygiene device comprises one of a capacitive-sensing sensor, an infrared detector, a vibration sensor, an electro-mechanical contact switch, or a pressure sensor, the sensor detecting the individual's hand at or within a predetermined area adjacent to the monitored hand hygiene device.

10. The system of claim 7, wherein the feedback device is one of a visual display, an audio/visual display or an audio device.

11. The system of claim 7, wherein the identification signal comprises a data packet further including one or more of an exit/entry detector identity or a control unit identity.

12. A method for detecting the use of a monitored hand hygiene device, the method comprising:
    sensing an illumination signal transmitted from an entry/exit unit associated with a room or area where the monitored hand hygiene device is located with a wearable tag operable in a low power mode to receive the illumination signal, the tag incorporating a transmitter for transmitting an identification code from which a health care provider role of an individual associated with the tag may be determined;
    transmitting an identification signal from the tag, wherein the tag is operable in an active mode upon receiving the illumination signal or a range limited signal to transmit the identification signal including the identification code;
    detecting a parameter indicating use of the monitored hand hygiene device with a control unit including a sensor for detecting the parameter and an associated transmitter for transmitting the range limited signal;
    transmitting the range limited signal over a limited, predetermined area with the control unit upon detecting the parameter indicating use of the monitored hand hygiene device whereby the tag is activated to transmit the identification signal to a receiver of the control unit;

receiving identification signals transmitted from the tag with a network and storing information associated with the identification signals with a server connected to the network; and presenting the individual using the monitored hand hygiene device with health condition information specific to health conditions for which a patient in the room or area is being treated and to the health care provider role associated with the tag of the individual by displaying the health condition information on a feedback device associated with the monitored hand hygiene device wherein the health condition information is presented upon the control unit receiving the identification signal transmitted from the tag in response to the tag receiving the range limited signal.

13. The method of claim 12, wherein the feedback device is one of a visual device, an audio/visual device or an audio device.

14. The method of claim 12, wherein the parameter indicating use of the monitored hand hygiene device is one of proximity of the individual, vibration of the monitored hand hygiene device or movement of a component of the monitored hand hygiene device.

15. The method of claim 12, wherein at least one of the illumination signals transmitted by the entry/exit unit, the range limited signals transmitted by the control unit or the identification signals transmitted by the tag are received by the network and translated to TCP/IP format for storage in the server.

16. The method of claim 12, wherein the signals received from one or more of the entry/exit unit, the control unit or the tag are transmitted to the server via one of a wired Ethernet data connection, a wireless Ethernet data connection or a cellular connection.

17. A method of promoting use of a hand hygiene system in a health care facility, the method comprising:

storing in a database information specific to health conditions for which individual patients in the health care facility are being treated and wherein the information is further specified according to a role of a health care provider;

identifying an individual, including the individual's health care provider role, within a selected proximity of a monitored hand hygiene unit in a room in which one of the individual patients is resident;

retrieving from said database information selected based upon the health care provider role of the individual and the health condition for which the resident patient is being treated;

displaying the selected information on a feedback device associated with the monitored hand hygiene unit upon said individual's use of the monitored hand hygiene unit.

18. The method of claim 17, wherein said identification step comprises reading a wearable tag on said individual using the monitored hand hygiene unit, said tag comprising an identification code for which the health care provider role of the individual associated with said tag may be determined.

19. The method of claim 17, wherein said feedback device comprises a graphical display.

20. The method of claim 17, wherein the selected information is displayed for a predetermined time period based upon the identity of said identified individual using the hand hygiene unit.

21. The method of claim 17, wherein the health care provider role is selected from the group consisting of: physician, physician specialty, nurse, therapist.

* * * * *